United States Patent
Kato et al.

(10) Patent No.: US 9,041,269 B2
(45) Date of Patent: May 26, 2015

(54) MOTOR

(75) Inventors: Shigemasa Kato, Shizuoka-ken (JP);
Seiya Yokoyama, Shizuoka-ken (JP);
Yoji Yamada, Shizuoka-ken (JP);
Keisuke Koide, Shizuoka-ken (JP);
Yoshiaki Takemoto, Shizuoka-ken (JP);
Shinji Santo, Shizuoka-ken (JP)

(73) Assignee: Asmo Co., Ltd. (JP)

( * ) Notice: Subject to any disclaimer, the term of this patent is extended or adjusted under 35 U.S.C. 154(b) by 511 days.

(21) Appl. No.: 13/160,026

(22) Filed: Jun. 14, 2011

(65) Prior Publication Data

US 2011/0309707 A1     Dec. 22, 2011

(30) Foreign Application Priority Data

Jun. 17, 2010 (JP) ................. 2010-138297
Jun. 17, 2010 (JP) ................. 2010-138298
Jun. 30, 2010 (JP) ................. 2010-148915
Jun. 30, 2010 (JP) ................. 2010-148916

(51) Int. Cl.
| H02K 21/12 | (2006.01) |
| H02K 1/06 | (2006.01) |
| H02K 1/27 | (2006.01) |
| H02K 1/14 | (2006.01) |
| H02K 1/30 | (2006.01) |
| H02K 5/173 | (2006.01) |

(Continued)

(52) U.S. Cl.
CPC .............. *H02K 1/2746* (2013.01); *H02K 1/146* (2013.01); *H02K 1/30* (2013.01); *H02K 5/1732* (2013.01); *H02K 11/0005* (2013.01); *H02K 21/14* (2013.01); *H02K 21/16* (2013.01); *H02K 29/03* (2013.01); *H02K 2213/03* (2013.01)

(58) Field of Classification Search
USPC ............ 310/156.48, 156.47, 156.53–156.57, 310/156.61, 156.58, 216.001–216.137
See application file for complete search history.

(56) References Cited

U.S. PATENT DOCUMENTS

| 6,597,079 B2 * | 7/2003 | Miyashita et al. ....... 310/156.48 |
| 6,703,753 B1 | 3/2004 | Fujinaka |

(Continued)

FOREIGN PATENT DOCUMENTS

| JP | 62-077050 A | 4/1987 |
| JP | 03-003622 A | 1/1991 |

(Continued)

OTHER PUBLICATIONS

"Japanese Application Serial No. 2010-138298, Office Action mailed Feb. 25, 2014", (w/ English Translation), 4 pgs.

(Continued)

*Primary Examiner* — Dang Le
*Assistant Examiner* — Leda Pham
(74) *Attorney, Agent, or Firm* — Schwegman Lundberg & Woessner, P.A.

(57) ABSTRACT

There is provided a motor including a rotor and a stator arranged outside the rotor in the radial direction. The rotor includes a rotor core, a plurality of magnets arranged at equal intervals in the circumferential direction of the rotor core and functioning as one magnetic pole, and salient poles integrated with the rotor core, each arranged between adjacent magnets and at a distance from the magnets. The salient poles function as the other magnetic pole. A stator has a stator core having a plurality of teeth extending in the radial direction of the stator and arranged at equal intervals in the circumferential direction, and multi-phase coils attached to the teeth.

9 Claims, 22 Drawing Sheets

(51) Int. Cl.
  *H02K 11/00* (2006.01)
  *H02K 21/14* (2006.01)
  *H02K 21/16* (2006.01)
  *H02K 29/03* (2006.01)

(56) References Cited

U.S. PATENT DOCUMENTS

| | | | |
|---|---|---|---|
| 7,176,598 B2 * | 2/2007 | Mori et al. | 310/156.57 |
| 8,247,940 B2 * | 8/2012 | Hino et al. | 310/156.47 |
| 2004/0056553 A1 | 3/2004 | Fujinaka | |
| 2004/0056554 A1 | 3/2004 | Fujinaka | |
| 2004/0056555 A1 | 3/2004 | Fujinaka | |
| 2004/0066109 A1 | 4/2004 | Fujinaka | |
| 2006/0145561 A1 | 7/2006 | Sakuma et al. | |
| 2011/0148240 A1 | 6/2011 | Koide et al. | |

FOREIGN PATENT DOCUMENTS

| | | |
|---|---|---|
| JP | 09-322445 | 12/1997 |
| JP | 09-327139 A | 12/1997 |
| JP | 2001-016806 A | 1/2001 |
| JP | 2002-153029 | 5/2002 |
| JP | 2003-070192 | 3/2003 |
| JP | 2003-189573 | 7/2003 |
| JP | 2004-364389 | 12/2004 |
| JP | 2005-012920 | 1/2005 |
| JP | 2008-178165 A | 7/2008 |

OTHER PUBLICATIONS

"Japanese Application Serial No. 2010-148916, Office Action mailed Mar. 4, 2014", (w/ English Translation), 5 pgs.

* cited by examiner

Fig.7A
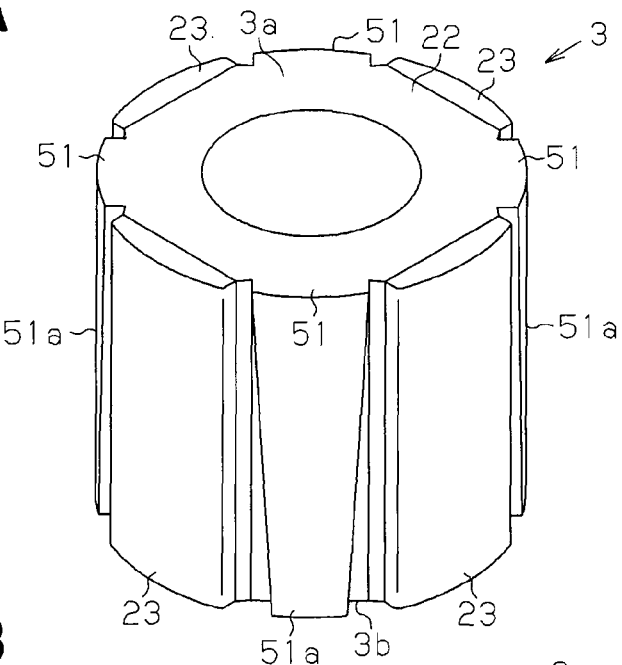
Fig.7B
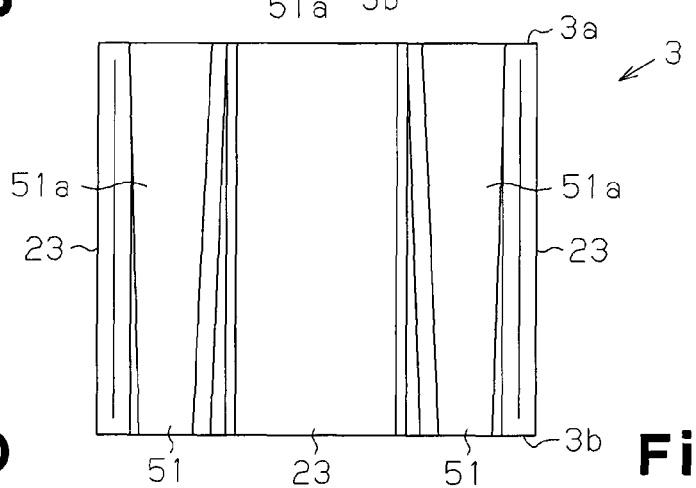
Fig.7D 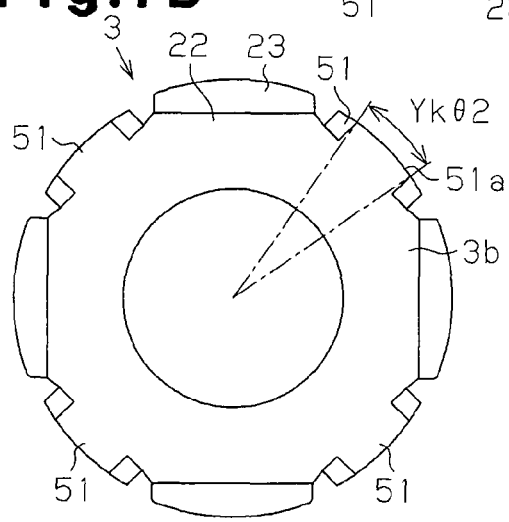 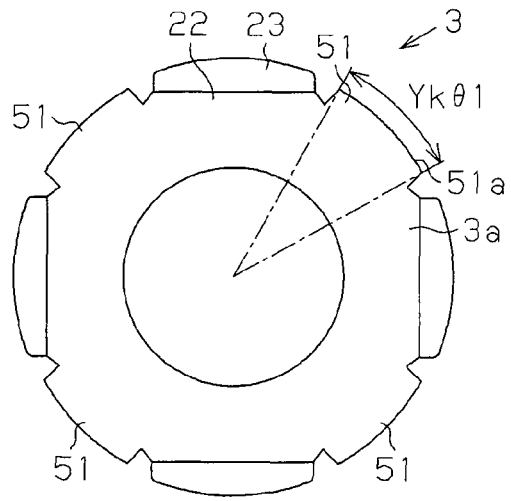 Fig.7C

US 9,041,269 B2

MOTOR

RELATED APPLICATION

This application claims the benefit of priority under 35 U.S.C. Section 119, to Japanese Patent Application Serial No. 2010-138297, filed Jun. 17, 2010; Japanese Patent Application Serial No. 2010-138298, filed Jun. 17, 2010, Japanese Patent Application Serial No. 2010-148916, filed Jun. 30, 2010; Japanese Patent Application Serial No. 2010-148915, filed Jun. 30, 2010, which applications are incorporated herein by reference in their entirety.

BACKGROUND OF THE INVENTION

The present invention relates to a motor having a rotor that employs a consequent-pole structure.

Conventionally, for example, as described in Japanese Laid-Open Patent Publication No. 9-327139, a motor having a rotor having a "consequent-pole structure" is known. The rotor having the consequent-pole structure includes a plurality of magnets arranged in the circumferential direction of a rotor core and functioning as one magnetic pole, and salient poles integrated with the rotor core and each arranged between adjacent magnets. The salient poles function as the other magnetic pole. In such a motor, since the number of magnets of the rotor can be reduced by half while performance deterioration is suppressed to a low level, the motor is advantageous in resource saving, cost reduction, or the like.

On a magnetic pole of a rotor having a consequent-pole structure as described in Japanese Laid-Open Patent Publication No. 9-327139, a magnet having a force (induction) of magnetic flux and a salient pole having no force of magnetic flux are mixed. For this reason, a magnetic imbalance easily occurs. This leads to deterioration of rotational performance such as an increase in vibration caused by, for example, generation of cogging torque.

SUMMARY OF THE INVENTION

It is an objective of the present invention to provide a motor that reduces vibration and can improve rotational performance.

In order to achieve the above objective, and in accordance with one aspect of the present invention, there is provided a motor including a rotor and a stator arranged outside the rotor in the radial direction. The rotor includes a rotor core, a plurality of magnets arranged at equal intervals in the circumferential direction of the rotor core and functioning as one magnetic pole, and salient poles integrated with the rotor core, each arranged between adjacent magnets and at a distance from the magnets. The salient poles function as the other magnetic pole. A stator has a stator core having a plurality of teeth extending in the radial direction of the stator and arranged at equal intervals in the circumferential direction, and multi-phase coils attached to the teeth. The salient poles are arranged to have center portions arranged at equal intervals in the circumferential direction, and each have an outer surface extending in the circumferential direction in a range of a predetermined opening angle having an axis of the rotor as a center. A first opening angle serving as an opening angle of an outer surface of a first salient pole is different from a second opening angle serving as an opening angle of an outer surface of a second salient pole.

According to another aspect of the present invention, there is provided a motor including a rotor and a stator arranged outside of the rotor in the radial direction thereof. The rotor has a rotor core, a plurality of magnets arranged in the circumferential direction of the rotor core and functioning as one magnetic pole, and salient poles integrated with the rotor core and each arranged between adjacent magnets and at a distance from the magnets. The salient poles function as the other magnetic pole. The stator has a stator core having teeth, the number of which is represented by L, extending in the radial direction of the stator and arranged at equal intervals in the circumferential direction, and multi-phase coils attached to the teeth. Each of the salient poles has an outer surface extending in the circumferential direction in a range of a first opening angle $Yk\theta(°)$ having an axis of the rotor as a center, and each of the teeth has a distal end portion extending in the circumferential direction in a range of a second opening angle $T\theta(°)$ having the axis of the rotor as a center. The first opening angle $Yk\theta(°)$ and the second opening angle $T\theta(°)$ are set to satisfy $Yk\theta = T\theta + (a-1) \times 360(°)/L$ (where a is a positive integer).

According to still another aspect of the present invention, there is provided a motor including a rotor and a stator. The rotor is a fourteen-magnetic-pole rotor having a rotor core, seven magnets arranged in the circumferential direction of the rotor core and functioning as one magnetic pole, and salient poles integrated with the rotor core and each arranged between adjacent magnets and at a distance from the magnets. The salient poles function as the other magnetic pole. The stator has a stator core having twelve teeth extending in the radial direction and arranged in the circumferential direction, twelve slots each arranged between adjacent teeth, and coils wound on the teeth and stored in the slots. The ratio A/B of the circumferential width A of the magnet and the circumferential width B at a distal end of the teeth facing the rotor in the radial direction is set to satisfy the expression $0.85 < A/B < 1.00$.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7A is a perspective view showing a rotor of another modification;

FIG. 7B is a side view of FIG. 7A;

FIG. 7C is a plan view showing the rotor in FIG. 7A when viewed from one end in the axial direction;

FIG. 7D is a plan view showing the rotor in FIG. 7A when viewed from the other end in the axial direction;

DETAILED DESCRIPTION OF THE PREFERRED EMBODIMENTS

A first embodiment obtained by embodying the present invention will be described below with reference to the accompanying drawings.

Figure 1A:
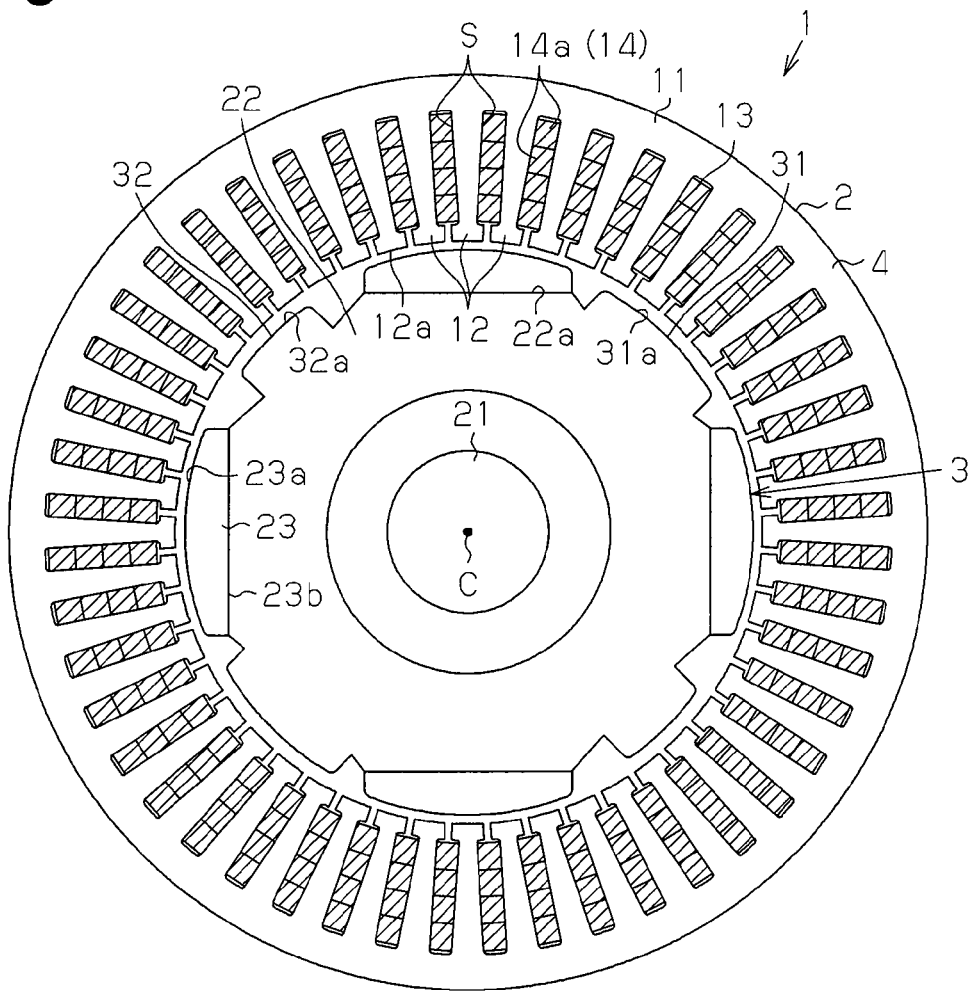
FIG. 1A is a schematic diagram of a motor according to a first embodiment of the present invention.

As shown in FIG. 1A, an inner-rotor type motor 1 includes a substantially annular stator 2 and a rotor 3 arranged inside the stator 2 in the radial direction thereof. The stator 2 substantially encloses the rotor 3.

Figure 1B:
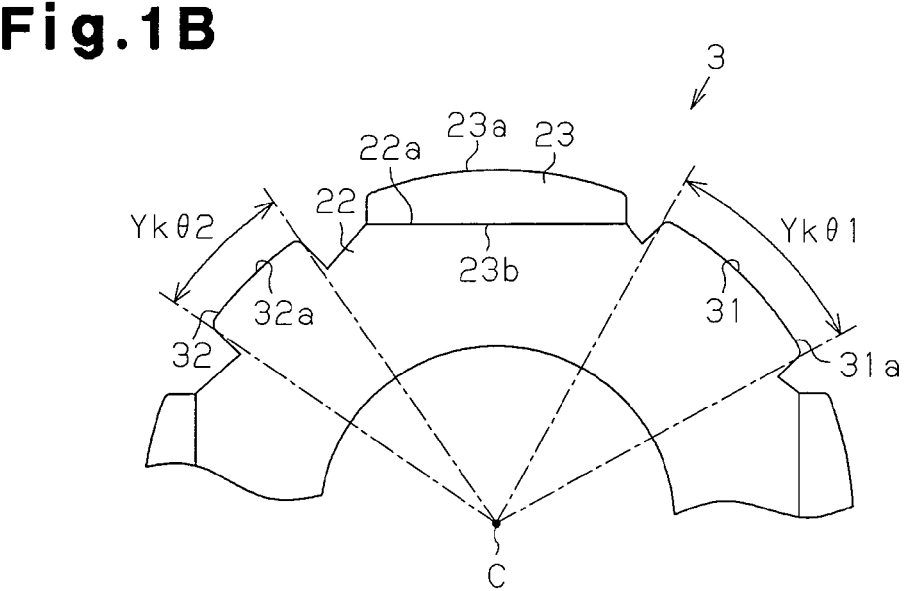
FIG. 1B is an enlarged diagram of a part of the rotor in the motor in FIG. 1A.

The stator 2, as shown in FIGS. 1A and 1B, includes a stator core 4. The stator core 4 has a cylindrical portion 11 and a plurality of (in the present embodiment, forty-eight) teeth 12 extending from the cylindrical portion 11 to the inside in the radial direction and arranged at equal intervals in the circumferential direction. Slots S are formed between adjacent teeth 12. Segment coils 13 for generating magnetic fields that rotate the rotor 3 are inserted into the slots S. More specifically, the number of slots S is equal to the number of the teeth 12 (in the present embodiment, forty-eight). Insulators (not shown) are interposed between the teeth 12 and the segment coils 13.

The segment coils 13 are arranged on teeth 12 by multi-phase (in the present embodiment, three phases) distributed winding. The segment coil 13 of each phase has a plurality of segment conductors 14 constituted by conductor plates that are bent to have substantially U shapes. The segment conductors 14 have slot insertion portions 14a arranged in the slots S so as to penetrate the stator core 4 in the axial direction (a direction orthogonal to the sheet of the drawing) and slot projecting portions (not shown) projecting from the slots S in the axial direction. One pair of slot insertion portions 14a of each of the segment conductors 14 correspond to parallel straight portions of the U shape, and are arranged in the two slots S placed at a distance from each other over six teeth 12 in the circumferential direction, respectively. One pair of slot projecting portions of each of the segment conductors 14 corresponds to both end portions of the U shape. The segment conductors 14 of each phase are electrically connected to each other in the circumferential direction at the slot projecting portions thereof.

The rotor 3 includes a rotating shaft portion 21 and a substantially annular rotor core 22 configured by a magnetic metal material fixed to an outer peripheral surface of the rotating shaft portion 21. On the outer peripheral portion of the rotor core 22, four N-pole magnets 23 are arranged at equal intervals in the circumferential direction. A first salient pole 31 and a second salient pole 32 that are integrally formed on the outer peripheral portion of the rotor core 22 are alternately arranged between the adjacent magnets 23 in the circumferential direction one by one. More specifically, the magnets 23 and the salient poles 31 and 32 are alternately arranged at equal angular intervals (in this case, arranged at 45° intervals). Therefore, the rotor 3 has an eight-magnetic-pole consequent-pole structure, and the first and second salient poles 31 and 32 function as an S pole with respect to the magnets 23 functioning as N poles. The number of pairs of poles of the rotor 3 is the same as the number of magnets 23, and the number of pairs of poles is four in the present embodiment. The number of teeth 12 arranged over the segment conductors 14 is determined by the ratio of (the number of slots)/(the number of magnetic poles).

Each of the magnets 23 is slightly larger than each of the first and second salient poles 31 and 32 in the circumferential length and has a substantially square prism shape having a curved outer surface 23a and a flat inner surface 23b. Each of the outer surfaces 23a has an arcuate shape included in the same circumference having an axis C as a center and faces a distal end portion 12a of the teeth 12. Each of the inner surfaces 23b is fixed to a fixing surface 22a of the rotor core 22 arranged between the salient poles 31 and 32, and a gap is formed in the circumferential direction between the salient poles 31 and 32 adjacent to the magnet 23.

The first and second salient poles 31 and 32 have shapes projecting to the outside in the radial direction substantially in sectoral forms, and the central portions of the salient poles are arranged at equal intervals in the circumferential direction. The first and second salient poles 31 and 32 have radial outer surfaces 31a and 32a having curved surfaces, respectively. An opening angle (first opening angle) $Yk\theta1$ of the outer surface 31a of the first salient pole 31 having the axis C of the rotor 3 as a center is different from an opening angle (second opening angle) $Yk\theta2$ of the outer surface 32a of the second salient pole 32. The "opening angle" of the outer surfaces 31a and 32a refers to an angular range of the outer surfaces 31a and 32a in the circumferential direction. The opening angles $Yk\theta1$ and $Yk\theta2$ are constant in the axial direction. The outer surfaces 31a and 32a have arcuate shapes included in the same circumference having the axis C as a center, and are relatively located on the inside in the radial direction with reference to the outer surfaces 23a of the magnet 23. More specifically, the diameter of the circumference including the outer surfaces 31a and 32a is smaller than the diameter of the circumference including the outer surface 23a.

In this case, a boundary angle at which the cogging torque generated when the opening angle $Yk\theta1$ of the outer surface 31a of the first salient pole 31 (or second opening angle $Yk\theta2$ of the outer surface 32a of the second salient pole 32) is gradually changed is phase-inverted from a normal phase to an antiphase is represented by $\alpha$, and a boundary angle at which the cogging torque is phase-inverted from the antiphase to the normal phase is represented by $\beta$ (where $\alpha<\beta$). When one of the opening angles $Yk\theta1$ and $Yk\theta2$ is smaller than the boundary angle $\alpha$ or larger than the boundary angle $\beta$, and the other is not less than $\alpha$ and not more than $\beta$. More specifically, the opening angles $Yk\theta1$ and $Yk\theta2$ are set such that the phases of the cogging torques generated at the first and second salient poles 31 and 32 are different from each other. In this manner, since the cogging torque generated at the first salient pole 31 is suppressed by the cogging torque generated at the second salient pole 32, the cogging torques can be more reliably reduced, and the rotational performance of the rotor 3 can be improved.

The radial inner end portion of each of the teeth 12, i.e., the distal end portion 12a extends in the circumferential direction in a range of a predetermined opening angle having the axis C as a center. In the present embodiment, the opening angle of the distal end portion 12a of each of the teeth 12 is represented by $T\theta(°)$, and the total number of teeth 12 arranged on the cylindrical portion 11 of the stator core 4 is represented by L. In this case, the boundary angles $\alpha$ and $\beta$ are expressed by the following expressions (1) and (2), respectively.

$$\alpha = T\theta + (a-1) \times 360(°)/L \text{ (where a is a positive integer)} \quad (1),$$

$$\beta = \alpha + 360(°)/L \quad (2)$$

In these expressions, $360(°)/L$ refers to the angle between the circumferential centers of the distal end portions 12a of the adjacent teeth 12 having as a center (in other words, the angle between circumferential centers of the gaps between the adjacent teeth 12 having the axis C as a center). More specifically, the right-hand side of expression (1) represents the angle between circumferential outermost ends of a set of teeth 12 the number of which is represented by a serially arranged in the circumferential direction and having the axis C as a center. More specifically, the boundary angle $\alpha$ is equal to an angle including the teeth 12, the number of which is represented by a, serially arranged in the circumferential direction and having the axis C as a center, and the boundary angle $\beta$ is equal to an angle including the (a+1) teeth 12 serially arranged in the circumferential directions and having the axis C as a center.

Figure 4:
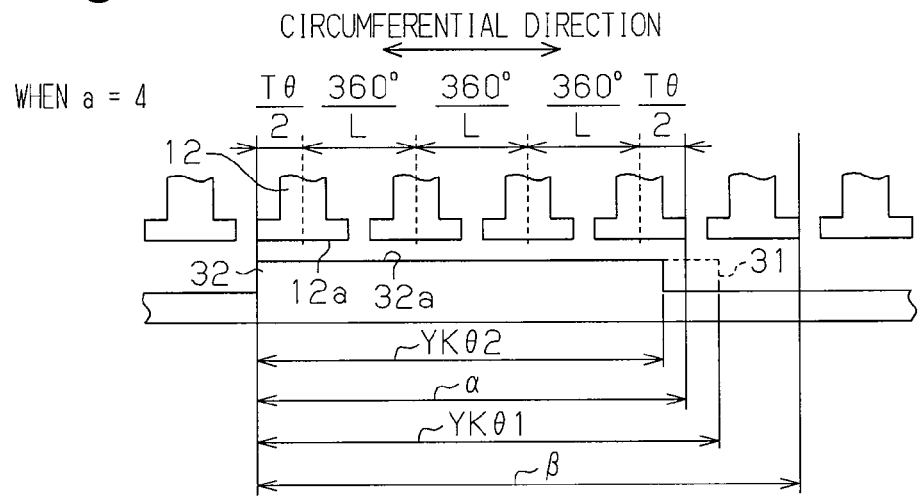
FIG. 4 is a schematic diagram showing the relationship between salient poles and teeth in the motor in FIG. 1A.

FIG. 4 shows a case in which a=4. In this case, the boundary angle $\alpha$ is the angle between the circumferential outermost ends of the set of four teeth 12 serially arranged in the circumferential direction, and the boundary angle $\beta$ is the angle between circumferential outermost ends of a set of five teeth 12 serially arranged in the circumferential direction. In the present embodiment, the opening angle $Yk\theta2$ of the outer surface 32a of the second salient pole 32 is smaller than the boundary angle $\alpha$, and the opening angle $Yk\theta1$ of the outer surface 31a of the first salient pole 31 is not less than the boundary angle $\alpha$ and not more than the boundary angle $\beta$. More specifically, the opening angles $Yk\theta1$ and $Yk\theta2$ are set such that the phases of the cogging torques generated at the first and second salient poles 31 and 32 are different from each other.

In the stator 2 according to the present embodiment, the number (the number of pairs of poles) of the magnets 23 of the rotor 3 is represented by p (where p is an integer equal to or larger than 2), and the number of phases of the segment coils 13 is represented by m. In this case, the total number L of teeth 12 satisfies the following expression.

$$L = 2 \times p \times m \times n \text{ (where n is a positive integer)} \quad (3)$$

In the present embodiment, as described above, the number (p) of pairs of poles of the rotor 3 is 4, the number (m) of phases of the segment coils 13 is three, and n is two. For this reason, on the basis of the expression, the total number L of teeth 12 is set by $L = 2 \times 4 \times 3 \times 2 = 48$. An opening angle $T\theta$ of the teeth 12 is set to $7(°)$. More specifically, in the present embodiment, the boundary angle $\alpha$ is $29.5(°)$, the boundary angle $\beta$ is $37(°)$ (see FIG. 2), an opening angle $Yk\theta2$ is smaller than $29.5(°)$, and the opening angle $Yk\theta1$ is not less than $29.5(°)$ and not more than $37(°)$.

Figure 2:
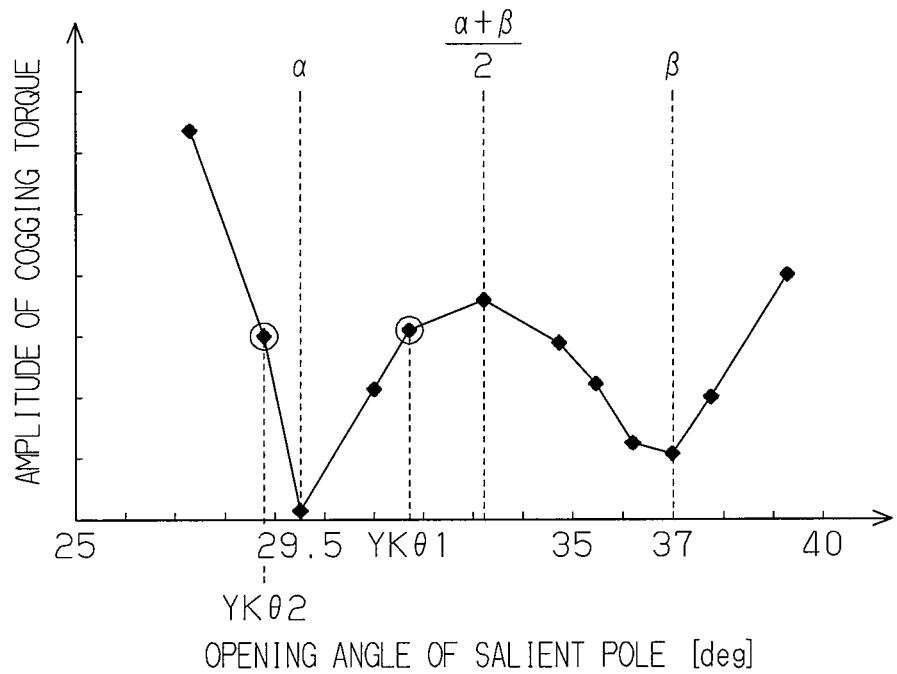
FIG. 2 is a graph showing the relationship between the opening angle and the amplitude of the cogging torque in the motor in FIG. 1A.
Figure 3:
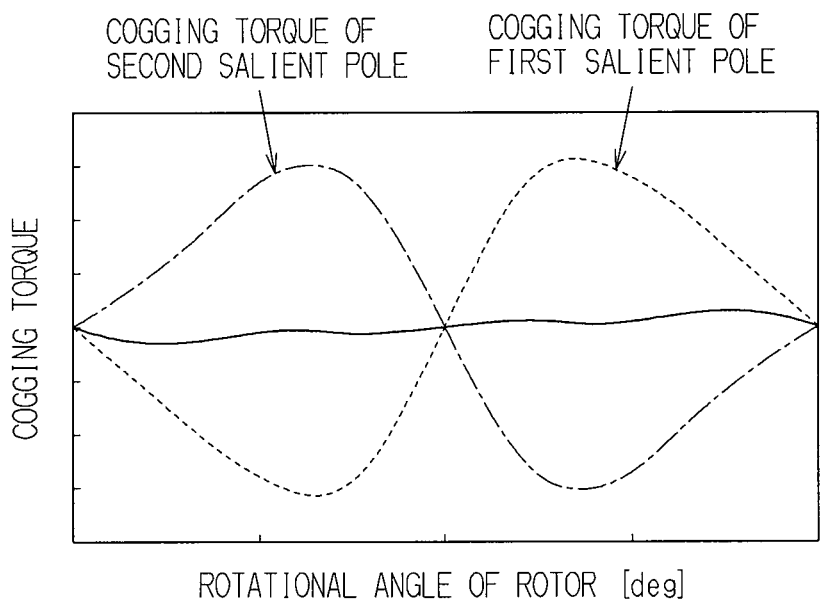
FIG. 3 is a graph showing the relationship between a rotational angle of the rotor and the cogging torque in the motor in FIG. 1A.

The opening angles $Yk\theta1$ and $Yk\theta2$ are preferably set such that the amplitudes of the cogging torques generated at the first and second salient poles 31 and 32 are close to each other. For example, as shown in FIGS. 2 and 3, when the opening angles $Yk\theta1$ and $Yk\theta2$ are set to about $31.7(°)$ and about $28.8(°)$, respectively, the phases of the cogging torques generated at the first and second salient poles 31 and 32 are different from each other, and the amplitudes of the cogging torques are substantially equal to each other. In this case, the cogging torques generated at the first and second salient poles 31 and 32 are canceled out, and the amplitude of the cogging torque of the entire motor 1 (torque obtained by synthesizing cogging torques generated at the first and second salient poles 31 and 32, and a waveform indicated by a solid line in FIG. 3) is suppressed to a low level.

Furthermore, in the present embodiment, the opening angle $Yk\theta2$ is smaller than the boundary angle $\alpha$, and the opening angle $Yk\theta1$ is not less than the boundary angle $\alpha$ and not more than $\{(\alpha+\beta)/2\}$. More specifically, the first opening angle $Yk\theta1$ is set to a value that is closer to the boundary angle $\alpha$ rather than the average of the boundary angles $\alpha$ and $\beta$ in the range between the boundary angle $\alpha$ and the boundary angle $\beta$. In this manner, intervals between the first and second salient poles 31 and 32 and the magnets 23 in the circumferential direction can be increased while the phases of the cogging torques generated at the first and second salient poles 31 and 32 are made different from each other. For this reason, a leakage flux caused by the narrow interval can be suppressed to a low level.

According to the present embodiment, the following advantages can be obtained.

(1) A plurality of salient poles of the rotor 3 are arranged to have center portions arranged at equal intervals in the circumferential direction. Of the plurality of salient poles, the first salient pole 31 (first salient pole portion) and the second salient pole 32 (second salient pole portion) have the outer surfaces 31a and 32a, respectively, and the opening angles Ykθ1 and Ykθ2 of the outer surfaces 31a and 32a having the axis C of the rotor 3 as a center are different from each other. In this manner, since generation timings of cogging torques generated at the first and second salient poles 31 and 32 are different from each other, in comparison with a configuration in which the opening angles of all the salient poles are equal to each other, the cogging torque generated on the entire motor 1 can be reduced, and the rotational performance of the rotor 3 can be improved.

(2) Any one of the opening angles Ykθ1 and Ykθ2 of the outer surfaces 31a and 32a of the first and second salient poles 31 and 32 is smaller than the boundary angle α or larger than the boundary angle β, and the other is not less than α and not more than β. In this manner, the opening angles Ykθ1 and Ykθ2 are set such that the phases of the cogging torques generated at the first and second salient poles 31 and 32 are different from each other. Therefore, since the cogging torque generated at the first salient pole 31 is suppressed by the cogging torque generated at the second salient pole 32, the cogging torques can be more reliably reduced.

(3) Any one of the opening angles Ykθ1 and Ykθ2 of the outer surfaces 31a and 32a of the first and second salient poles 31 and 32 is smaller than the boundary angle α, and the other is not less than the boundary angle α and not more than $\{(\alpha+\beta)/2\}$. More specifically, one of the opening angles Ykθ1 and Ykθ2 is set to be smaller than the boundary angle α, and the other is set to a value that is closer to the boundary angle α rather than the average of the boundary angles α and β in the range between the boundary angle α and the boundary angle β. In this manner, intervals between the first and second salient poles 31 and 32 and the magnets 23 in the circumferential direction can be increased while the phases of the cogging torques generated at the first and second salient poles 31 and 32 are made different from each other. For this reason, a leakage flux caused by the narrow interval can be suppressed to a low level.

The above embodiment may be modified as follows.

In the above embodiment, the opening angle Ykθ2 of the outer surface 32a of the second salient pole 32 is set to be smaller than the boundary angle α, and the opening angle Ykθ1 of the outer surface 31a of the first salient pole 31 is set to be not less than the boundary angle α and not more than $\{(\alpha+\beta)/2\}$. However, the present invention is not limited to the values. For example, as long as the opening angles Ykθ1 and Ykθ2 are different from each other, the angles may be set to be out of the range.

For example, even though the opening angle Ykθ2 is set to be larger than the boundary angle β, the phases of the cogging torques generated at the first and second salient poles 31 and 32 can be made different from each other. In this case, when the opening angle Ykθ1 is set to be not less than $\{(\alpha+\beta)/2\}$ and not more than the boundary angle β, intervals between the first and second salient poles 31 and 32 and the magnets 23 in the circumferential direction can be set to be small while the phases of the cogging torques generated at the first and second salient poles 31 and 32 are made different from each other. For this reason, reduction in torque caused by the large interval can be suppressed.

In the above embodiment, a=4 is satisfied in expression (1), i.e., the boundary angle α is defined to be equal to the angle between circumferential outermost ends of a set of four teeth 12 serially arranged in the circumferential direction having the axis C as a center. However, the value a may be arbitrarily changed to a positive integer other than 4. More specifically, the angle between the circumferential outermost ends of a set of, for example, three teeth 12 serially arranged in the circumferential direction may be set to the boundary angle α, and the angle between circumferential outermost ends of the set of four teeth 12 serially arranged in the circumferential direction may be set to the boundary angle β. In this manner, even though the value a is a positive integer other than 4, the same advantages as those in the above embodiment can be obtained.

In the above embodiment, although the total number L of teeth 12 is set to 48 on the basis of expression (3), the number p of magnets 23, the number m of phases of the segment coils 13, and the positive integer n may be arbitrarily changed to change the total number L of teeth 12. More specifically, the number of pairs of poles of the rotor 3 may be a number other than 4, the number of phases of the segment coils 13 may be a number other than three, and the integer n may be a positive integer other than two.

In the above embodiment, in the rotor 3, the first salient pole 31 (first salient pole portion) and the second salient pole 32 (second salient pole portion) are arranged along the circumferential direction. However, the present invention is not limited to the specific arrangement.

Figure 5A:
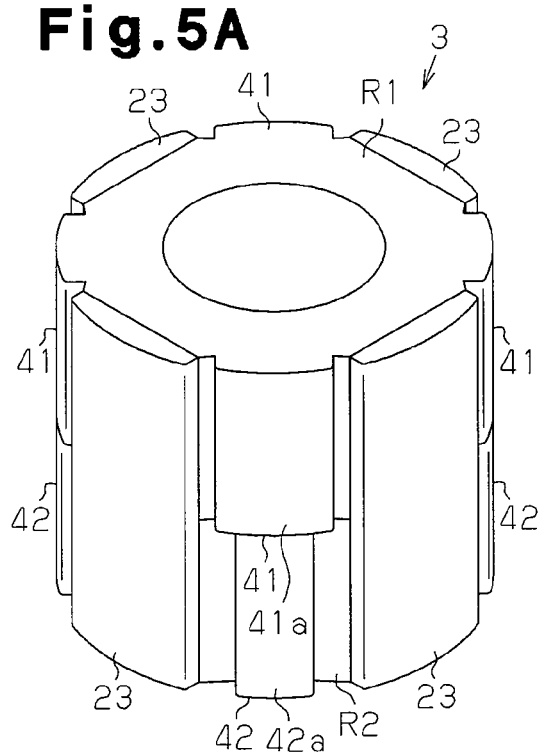
FIG. 5A is a perspective view showing a rotor in another modification.
Figure 5B:
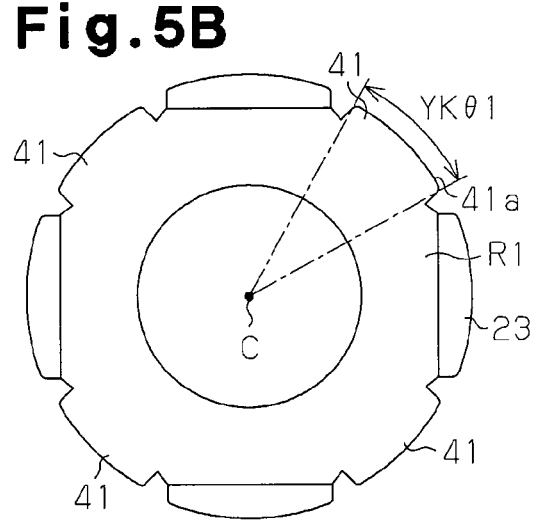
FIGS. 5B and 5C are plan views showing first and second rotor cores in the rotor in FIG. 5A, respectively.
Figure 5C:
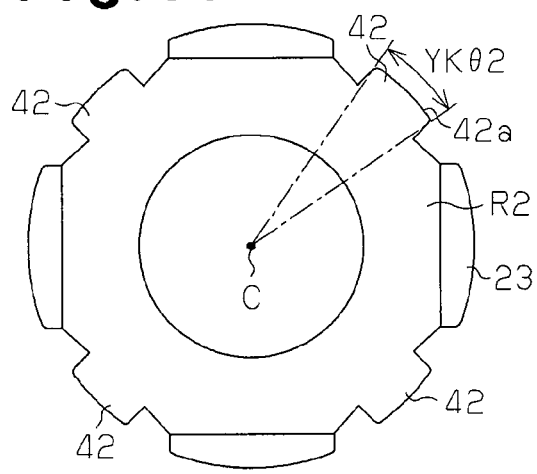
Figure 6:
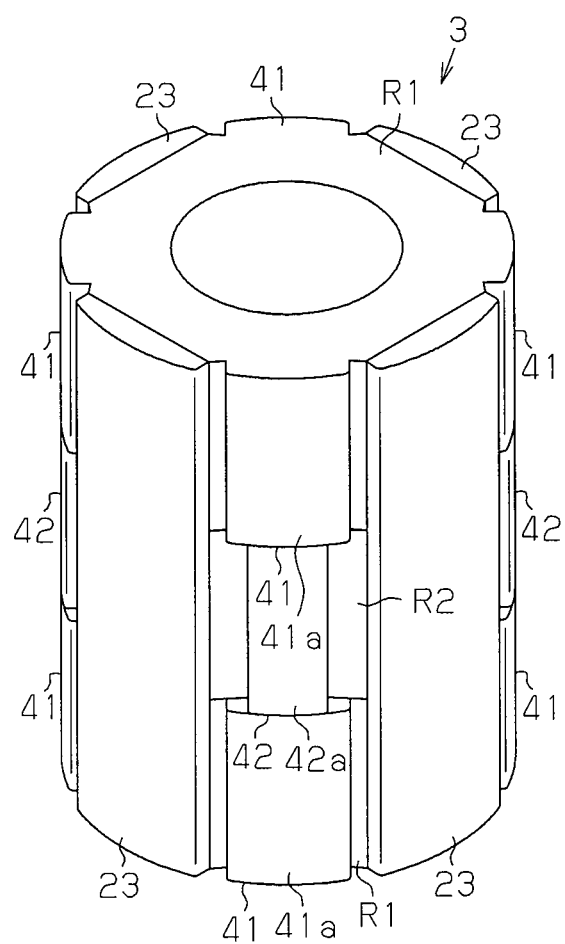
FIG. 6 is a perspective view showing a rotor of another modification.

For example, as shown in FIGS. 5A to 5C, the rotor 3 may have a tandem structure and include a first rotor core R1 and a second rotor core R2 stacked in the axial direction. On an outer peripheral portion of the first rotor core R1, first salient poles 41 each having an outer surface 41a having the opening angle Ykθ1 are arranged at equal intervals in the circumferential direction between the adjacent magnets 23. On an outer peripheral portion of the second rotor core R2, second salient poles 42 each having an outer surface 42a having the opening angle Ykθ2 are arranged at equal intervals in the circumferential direction between the adjacent magnets 23. In this case, the same advantages as those in the above embodiment can be obtained. In the example shown in FIG. 5, the rotor 3 has a two-stage configuration including the first and second rotor cores R1 and R2. However, three or more stages may be used. For example, the rotor 3 shown in FIG. 6 has a three-stage configuration, and includes the first rotor cores R1 located at both the ends in the axial direction and the second rotor core R2 at the center in the axial direction. In the multi-stage configuration shown in FIGS. 5 and 6, the number of pairs of poles of the rotor (i.e. the number of magnets 23) may be an odd (uneven) number such as ten salient poles (five pairs of poles) or fourteen salient poles (seven pairs of poles).

The opening angles of the outer surfaces of the salient poles need not be constant in the axial direction, and the opening angles may be changed depending on positions in the axial direction. For example, in the rotor 3 shown in FIGS. 7A to 7D, a salient pole 51 between the magnets 23 is tapered in the axial direction. More specifically, the opening angle of an outer surface 51a is Ykθ1 at one end 3a of the rotor 3 in the axial-direction, gradually decreases toward the other end 3b of the rotor 3, and is Ykθ2 at the other-end 3b. More specifically, each of the salient poles 51 has a first salient pole portion and a second salient portion having different opening angles at different positions in the axial direction. In this case, the same advantages as those in the above embodiment can be obtained.

Figure 8A:
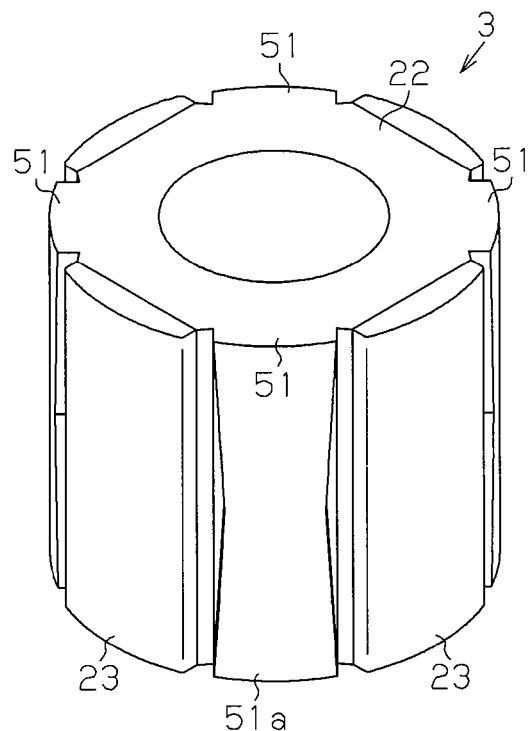
FIGS. 8A and 8B are perspective views of a rotor of another modification.
Figure 8B:
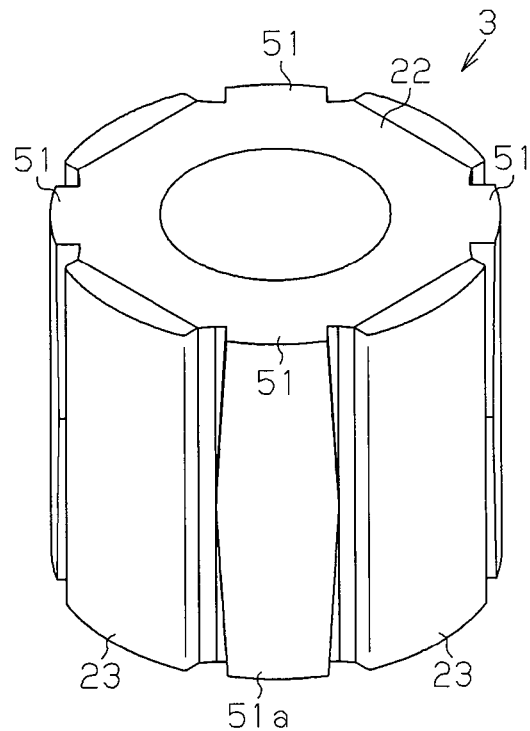
Figure 9:
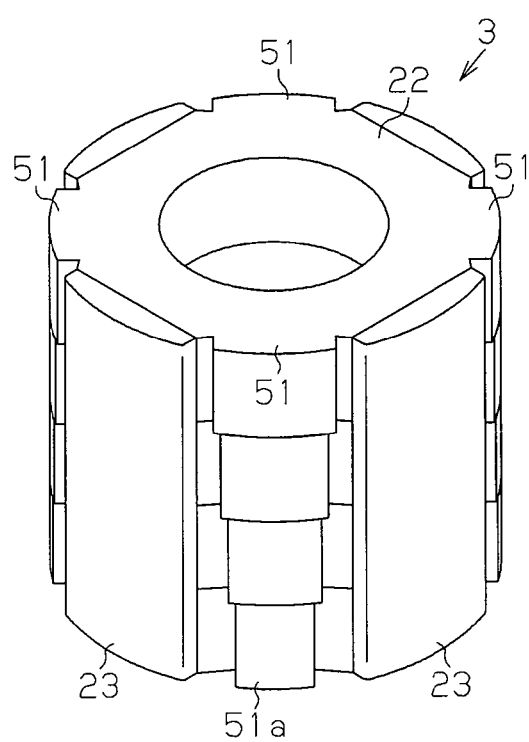
FIG. 9 is a perspective view of a rotor of another modification.

In the example shown in FIGS. 7A to 7D, the opening angles of the outer surfaces 51a of the salient poles 51 are designed to be maximum at the one end 3a and to be minimum at the other end 3b. In addition to this, for example, as shown in FIG. 8A, the opening angle may be minimum at an axial-direction center or may be maximum at both the ends in the axial direction. In contrast to this, as shown in FIG. 8B, the opening angle may be maximum at the axial-direction center and may be minimum at both the ends in the axial direction. As shown in FIG. 9, the rotor core 22 may have a multi-stage configuration, and opening angles of the stages may be made different from each other.

Figure 10:
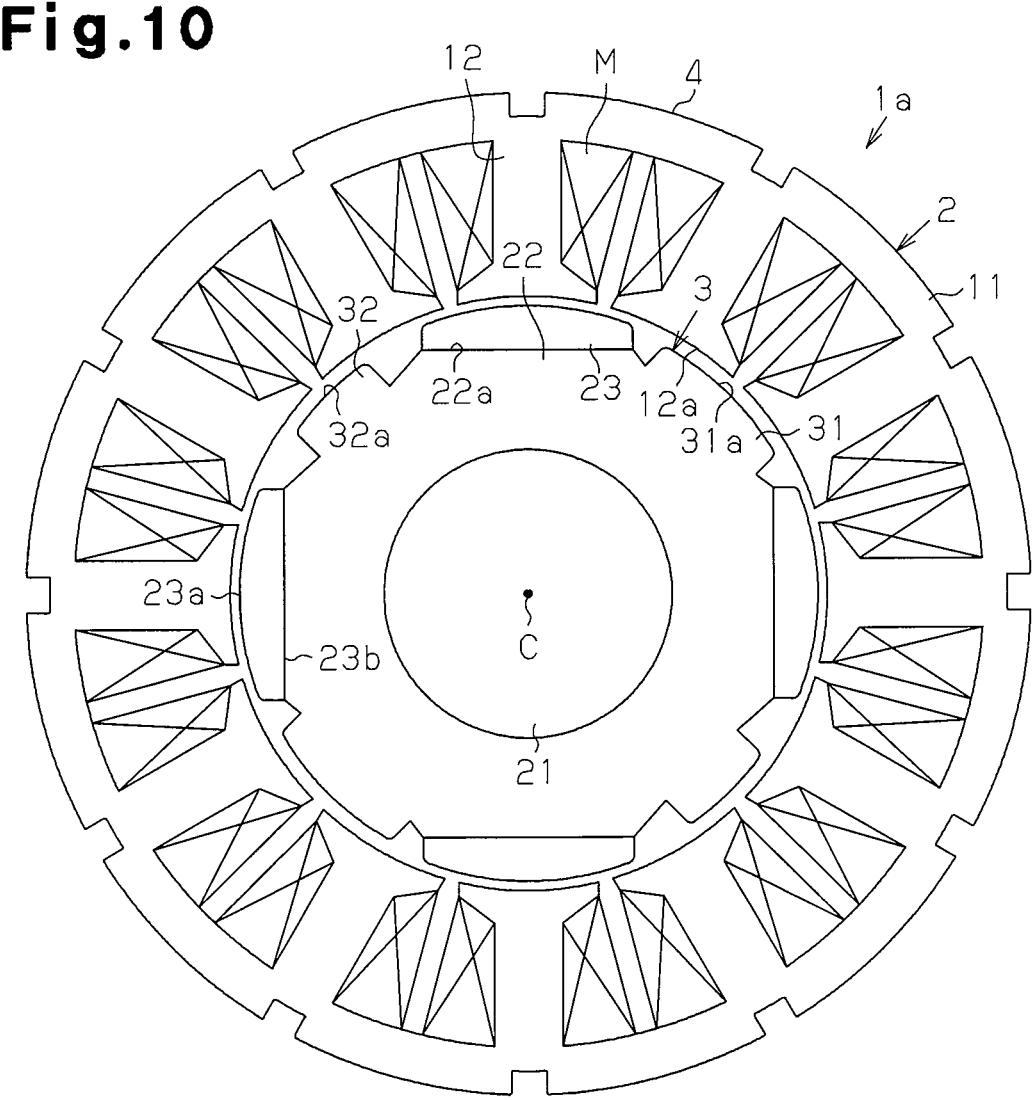
FIG. 10 is a schematic diagram of a motor of another modification.

In the above embodiment, as the coils of the stator 2, the segment coils 13 are used. However, the coils are not limited to the segment coils 13, and a conducting wire (a continuous wire) may be used. For example, in a motor 1a shown in FIG. 10, the total number L of teeth 12 is determined by L=p×m. In FIG. 10, since the number (p) of magnets 23 and the number (m) of phases of coils M are four and three, respectively, L=4×3=12 is satisfied. On the teeth 12, the coils M configured by a conducting wire (continuous wire) is wound. In the motor 1a, the number (8) of magnetic poles of the rotor 3 is ⅔ times the number (12) of teeth 12, and the ratio of the number of magnetic poles of the rotor 3 and the number of teeth 12 is given by 2:3.

A second embodiment obtained by embodying the present invention will be described below. The second embodiment is different from the first embodiment mainly in that the number of pairs of poles of a rotor is five and opening angles of all salient poles are equal to each other. The same reference numerals as in the first embodiment denote the same parts in the second embodiment, and a description thereof will be omitted.

Figure 11A:
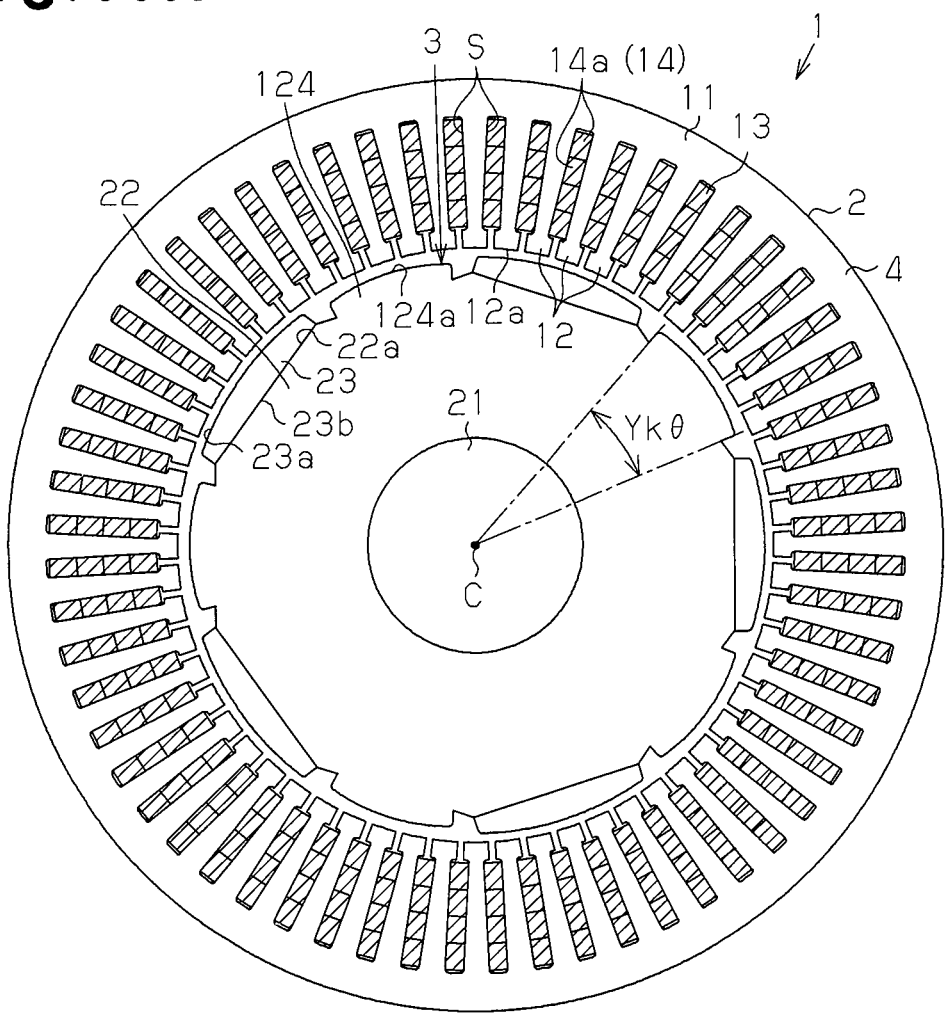
FIG. 11A is a schematic diagram of a motor according to a second embodiment of the present invention.
Figure 11B:
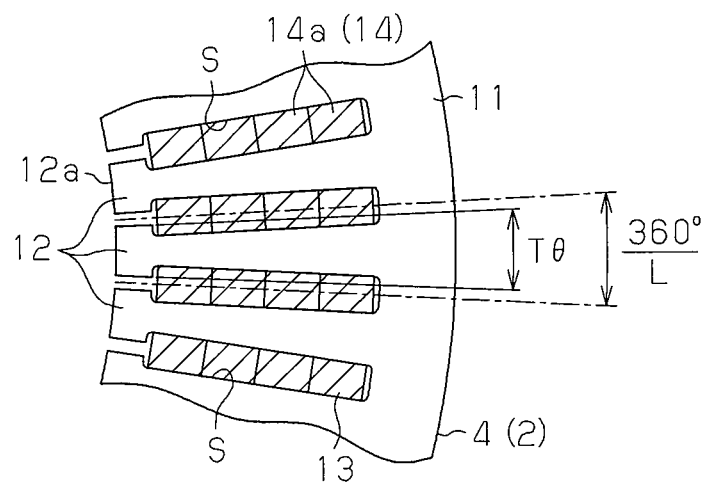
FIG. 11B is an enlarged view of teeth in the motor in FIG. 11A.

As shown in FIGS. 11A and 11B, the stator core 4 has the cylindrical portion 11 and the plurality (sixty in the present embodiment) of teeth 12 extending from the cylindrical portion 11 to the inside in the radial direction and arranged at equal intervals in the circumferential direction. As in the first embodiment, slots S are formed between the adjacent teeth 12. More specifically, the number of slots S is equal to the number of teeth 12 (sixty in the present embodiment).

On the outer peripheral portion of the rotor core 22, five N-pole magnets 23 are arranged at equal intervals in the circumferential direction. Between the adjacent magnets 23, salient poles 124 integrated with the outer peripheral portion of the rotor core 22 are arranged. More specifically, the magnets 23 and the salient poles 124 are alternately arranged at equal intervals (in this case, the magnet 23 and the salient pole 124 are arranged at 180-degree opposite positions).

The salient poles 124 have shapes projecting to the outside in the radial direction substantially in sectoral forms. The salient pole 124 has a curved outer surface 124a, and the outer surface 124a of the salient poles 124 is smaller than the outer surface 23a of the magnet 23 in the circumferential direction by a gap between the outer surface 124a and the magnet 23. The diameter of the circumference including the outer surfaces 124a of the salient poles 124 is smaller than the diameter of the circumference including the outer surfaces 23a of the magnets 23.

In this case, an opening angle of the outer surface 124a having the axis C of the rotor 3 as a center is defined as a first opening angle $Yk\theta(°)$ (see FIG. 11A), an opening angle between both the circumferential ends of the distal end portion 12a of one of the teeth 12 having the axis C as a center is defined as a second opening angle $T\theta(°)$ (see FIG. 11B), and the total number of teeth 12 arranged on the cylindrical portion 11 of the stator core 4 is represented by L. In this case, the opening angle $Yk\theta$ is expressed by the following expression $$Yk\theta = T\theta + (a-1) \times 360(°)/L \text{ (where a is a positive integer)} \quad (4)$$

Figure 12:
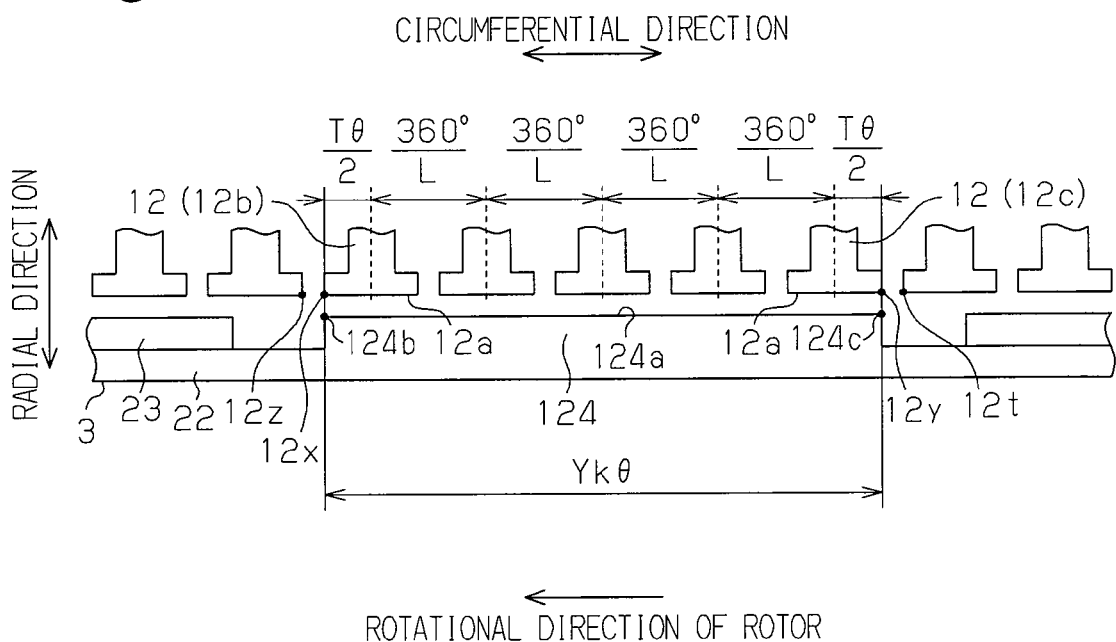
FIG. 12 is a schematic diagram showing the relationship between salient poles and teeth in the motor in FIG. 11A.

The right-hand side of expression (4) represents the angle between circumferential outermost ends of a set of teeth 12 the number of which is represented by a serially arranged in the circumferential direction and having the axis C as a center (see FIG. 12). Therefore, in the present embodiment, the opening angle $Yk\theta$ of the outer surface 124a of the salient pole 124 is equal to an angle including the teeth 12, the number of which is represented by a, serially arranged in the circumferential direction and having the axis C as a center. FIG. 12 shows a case in which a=5 is satisfied.

More specifically, in the present embodiment, as shown in FIG. 12, when one end portion 124b (left-side end portion in FIG. 12) in the circumferential direction of the outer surface 124a of the salient pole 124 overlaps one end portion 12x (left-side end portion) in the circumferential direction of the distal end portion 12a of arbitrary first tooth 12 (tooth 12b in FIG. 12) in the radial direction, the other end portion 124c (right-side end portion) in the circumferential direction of the outer surface 124a overlaps the other end portion 12y (right-side end portion) in the circumferential direction of the "a"th tooth 12 (tooth 12c in FIG. 12) from the first tooth 12 in the circumferential direction (right side) in the radial direction. The "overlapping in the radial direction" mentioned above refers to a state in which the end portions 124b and 124c of the outer surface and the end portions 12x and 12y of the distal end portion 12a are located along one straight line in the radial direction.

Figure 13:
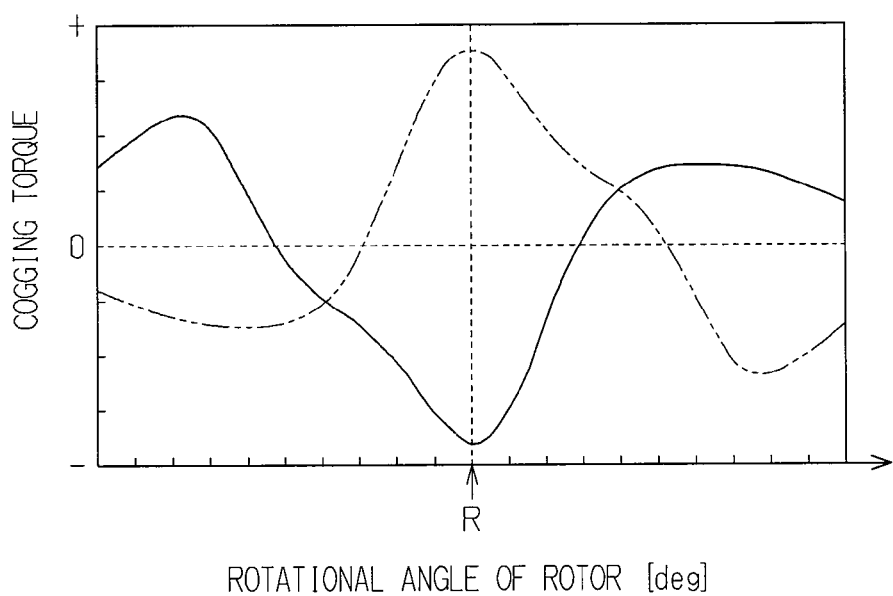
FIG. 13 is a graph showing the relationship between the rotational angle and the cogging torque of the rotor in the motor in FIG. 11A.

In FIG. 13, a cogging torque (to be referred to as a first cogging torque) obtained by summing up the cogging torque generated at the end portion 12x of the tooth 12b and the cogging torque generated at the end portion 12z facing the end portion 12x on the tooth adjacent to the tooth 12b is indicated by a solid line. A cogging torque (to be referred to as a second cogging torque) obtained by summing up the cogging torque generated at the end portion 12y of the tooth 12c and the cogging torque generated at an end portion 12t facing the end portion 12y on the teeth adjacent to the tooth 12c is indicated by a chain double-dashed line.

A rotational angle R of the rotor 3 in FIG. 13 corresponds to a state of the rotor 3 shown in FIG. 12. At the rotational angle R, the end portion 124b overlaps the end portion 12x in the radial direction. For this reason, magnetic fluxes are easily concentrated on the overlapping portion in the radial direction. As a result, the first cogging torque has a negative peak at the rotational angle R. Since the end portion 124c overlaps the end portion 12y in the radial direction, magnetic fluxes are easily concentrated on the overlapping portion in the radial direction. As a result, the second cogging torque has a positive peak at the rotational angle R. Phases of the peaks of the first and second cogging torques at the rotational angle R are different from each other, and the magnitudes of the cogging torques are substantially equal to each other. For this reason, the first and second cogging torques are canceled out. In this manner, the cogging torque of the entire motor 1 generated in rotation of the rotor 3 is reduced.

According to the second embodiment, the following advantages can be obtained.

(4) In the present embodiment, the opening angle of the outer surface 124a of the salient pole 124 is defined as an opening angle $Yk\theta(°)$, the opening angle between both the circumferential ends of the distal end portion 12a of one of the teeth 12 is defined as a opening angle Tθ(°), and the total number of teeth 12 arranged on the cylindrical portion 11 is represented by L. In this case, the opening angle Ykθ is set to satisfy the above expression (4). For this reason, when one end portion 124b in the circumferential direction of the outer surface 124a of the salient poles 124 overlaps one end portion 12x in the circumferential direction of the distal end portion 12a of the arbitrary first tooth 12 (tooth 12b) in the radial direction, the other end portion 124c in the circumferential direction of the outer surface 124a overlaps the other end portion 12y in the circumferential direction of the "a"th tooth 12 (tooth 12c) from the first tooth 12 in the circumferential direction. At this time, since the cogging torque (first cogging torque) generated near the end portion 124b serves as a component that cancels out the cogging torque (second cogging torque) generated near the end portion 124c, the cogging torque generated on the entire motor 1 can be reduced, and the rotational performance of the rotor 3 can be improved.

(5) In the present embodiment, the coils of the stator 2 are the multi-phase segment coils 13 having the plurality of segment conductors 14. Each of the segment conductors 14 has the slot insertion portion 14a penetrating the stator core 4 in the axial direction and arranged in the slot S, and a slot projecting portion projecting from the slot S in the axial direction. The segment conductors 14 of different phases are electrically connected to each other in the circumferential direction at the slot projecting portions. The number of pairs of poles of the rotor 3 and the number of phases of the segment coils 13 are represented by p and m, respectively. In this case, the number L of teeth 12 satisfies L=2×p×m×n (where n is a positive integer). In this manner, in the motor 1 in which the segment coils 13 are arranged on the stator 2 configured such that the number L of teeth 12 satisfies L=2×p×m×n (where n is a positive integer), the rotational performance of the rotor 3 can be improved.

The second embodiment may be modified as follows.

In the second embodiment, a=5 is satisfied in expression (4), i.e., the opening angle Ykθ of the outer surface 124a of the salient pole 124 is defined to be equal to the angle between circumferential outermost ends of a set of five teeth 12 serially arranged in the circumferential direction having the axis C as a center. However, the value a may be arbitrarily changed to a positive integer other than five.

In the second embodiment, the total number L of teeth 12 is set to sixty on the basis of expression (3). However, the number p of magnets 23, the number m of phases of the segment coils 13, and the positive integer n in expression (3) may be arbitrarily changed to change the total number L of teeth 12. More specifically, the number of pairs of poles of the rotor 3 may be a number other than five, the number of phases of the segment coils 13 may be a number other than three, and n may be a positive integer other than two.

Figure 14:
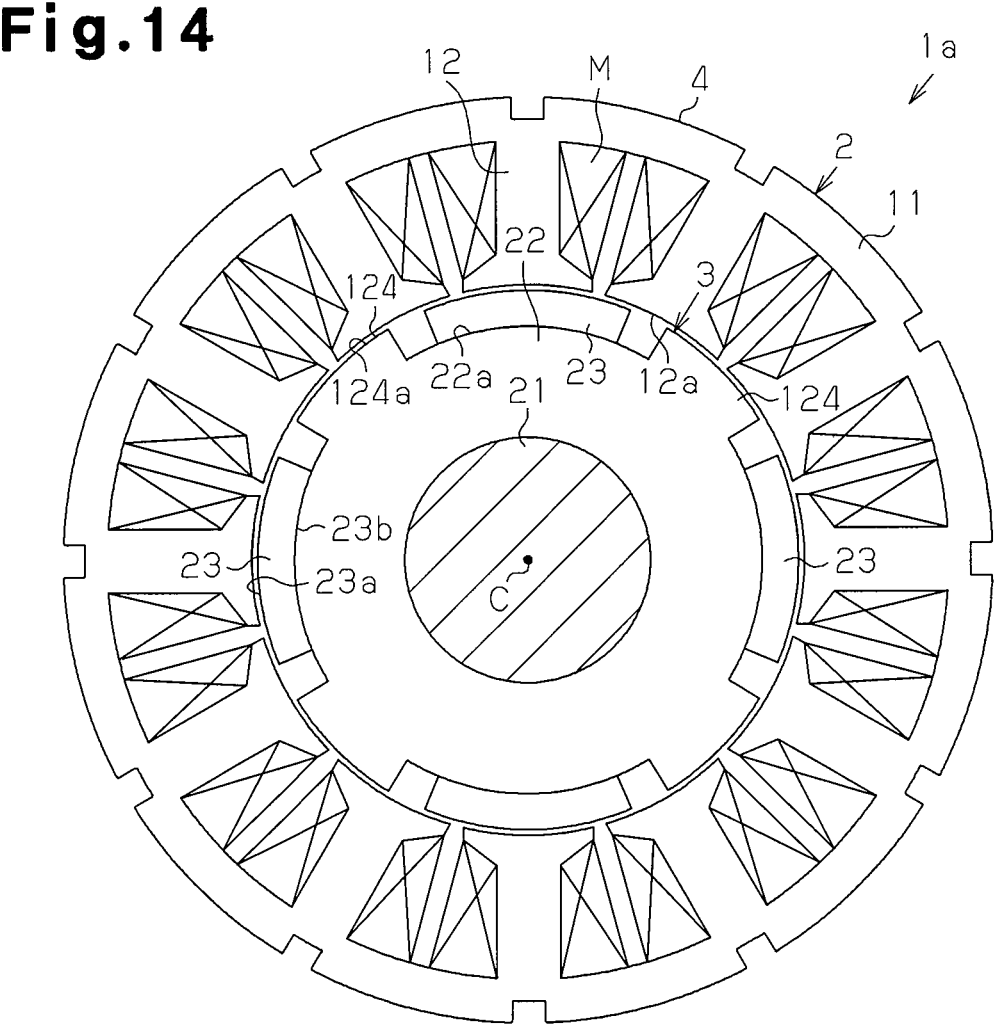
FIG. 14 is a schematic view of a motor of a modification.

In the second embodiment, as the coils of the stator 2, the segment coils 13 are used. However, the coils are not limited to the segment coils 13. For example, in the motor la shown in FIG. 14, the total number L of teeth 12 is determined by L=p×m. In FIG. 14, since the number (p) of magnets 23 and the number (m) of phases of coils M are four and three, respectively, L=4×3=12 is satisfied. On the teeth 12, the coils M made of conducting wires are wound. In the motor 1a, the number (8) of magnetic poles of the rotor 3 is ⅔ times the number (12) of teeth 12, and the ratio of the number of magnetic poles of the rotor 3 and the number of teeth 12 is given by 2:3.

Figure 15:
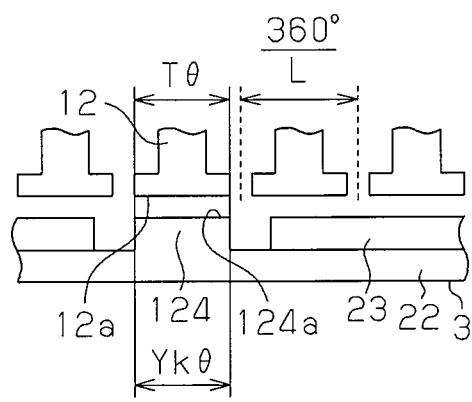
FIG. 15 is a schematic diagram showing the relationship between salient poles and teeth in the motor in FIG. 14.

In the example in FIG. 14, a=1 is satisfied in expression (4), i.e., the opening angle Ykθ of the outer surface 124a of the salient pole 124 is equal to the opening angle Tθ between the circumferential outermost ends of the distal end portions 12a of one of the teeth 12 having the axis C as a center (see FIG. 15). In this manner, when one end portion of the outer surface 124a of the salient pole 124 and one end portion of the teeth 12 overlap in the radial direction, the other end portions also overlap. In this manner, even in the motor 1a in which the ratio of the number of magnetic poles of the rotor 3 and the number of teeth 12 is given by 2:3, cogging torque is reduced to reduce vibration, and the rotational performance of the rotor 3 can be improved.

A third embodiment obtained by embodying the present invention will be described below. The same reference numerals as in the first and second embodiments denote the same parts as in the third embodiment, and a description thereof will be omitted.

Figure 16A:
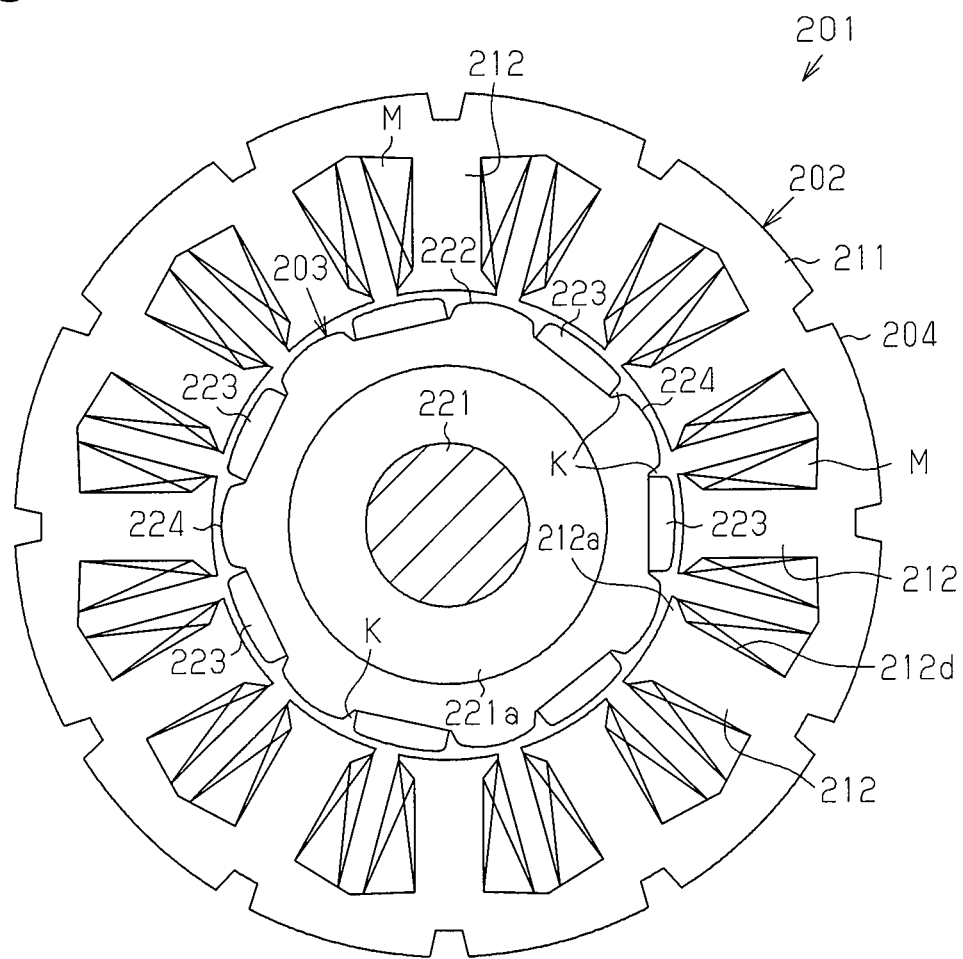
FIG. 16A is a plan view of a motor according to a third embodiment of the present invention.

FIG. 16A shows an inner-rotor type brushless motor (hereinafter simply referred to as a motor) 201. A rotor 203 of the motor 201 includes a rotating shaft portion 221 and a substantially annular rotor core 222 fixed to an outer peripheral surface of the rotating shaft portion 221 and made of a magnetic metal material. An intermediate member 221a made of a nonmagnetic material is interposed between the rotating shaft portion 221 and the rotor core 222. On an outer peripheral portion of the rotor core 222, 7 N-pole magnets 223 are arranged in the circumferential direction. Salient poles 224 integrated with the outer peripheral portion of the rotor core 222 are arranged between the adjacent magnets 223 through gaps K. More specifically, the N-pole magnets 223 and the salient poles 224 are alternately arranged at equal intervals (the magnet 223 and the salient pole 224 are arranged at 180-degree opposite positions). Therefore, the rotor 203 has a fourteen-magnetic-pole consequent-pole structure. The magnet 223 functions as an N pole, whereas the salient pole 224 functions as an S pole.

Figure 16B:
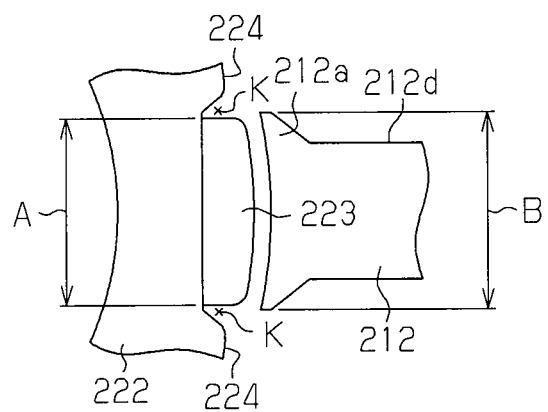
FIG. 16B is a partially enlarged view of the motor in FIG. 16A.

A stator 202 of the motor 201 includes a stator core 204. The stator core 204 has a cylindrical portion 211 and twelve teeth 212 extending from the cylindrical portion 211 to the inside in the radial direction at equal intervals. Between the adjacent teeth 212, slots to store the coils M wound on the teeth 212 is formed. The teeth 212 according to the present embodiment, as shown in FIG. 16B, each have a tooth shaft portion 212d on which the coils M are wound and a tooth distal end portion 212a projecting from the tooth shaft portion 212d to both the sides in the circumferential direction at the distal end portion of the tooth 212 when viewed in the axial direction. The tooth shaft portions 212d according to the present embodiment are arranged at equal 30° intervals in the circumferential direction, and the tooth distal end portions 212a uniformly project from the tooth shaft portions 212d to both the sides in the circumferential direction.

In this case, the ratio A/B of the circumferential width A of the magnet 223 and the circumferential width B at a distal end (tooth distal end portion 212a) of the teeth 212 facing the rotor 203 in the radial direction is set to satisfy the expression 0.85<A/B<1.00. In the present embodiment, the ratio A/B is 0.95.

According to the third embodiment, the following advantages can be obtained.

Figure 17:
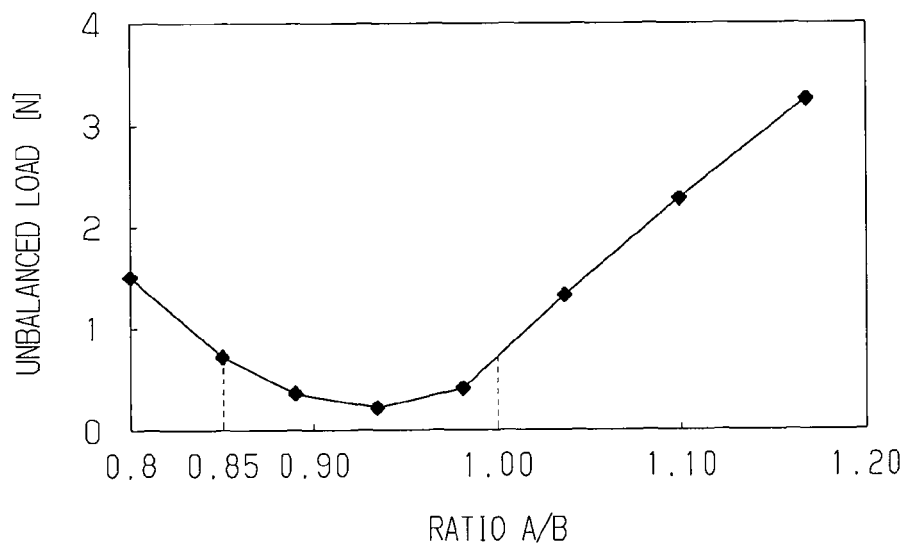
FIG. 17 is a graph showing the relationship between the ratio A/B of circumferential widths of a magnet and a distal end portion of the teeth, and unbalanced loads in the motor in FIG. 16A.
Figure 18A:
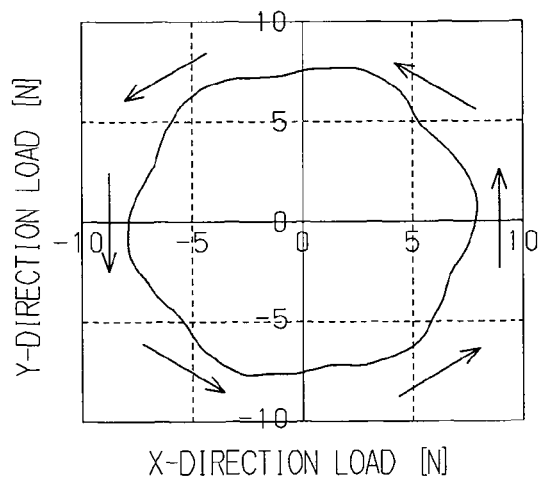
FIGS. 18A and 18B are diagrams showing traces of unbalanced loads generated on the rotor when the radio A/B is 0.95 and 1.10.
Figure 18B:
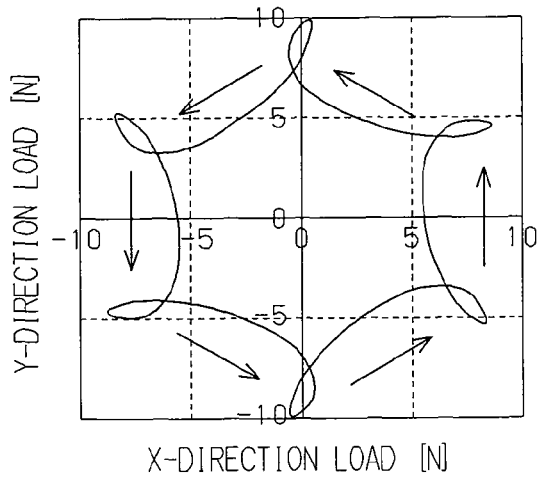

(1) In the motor 201 having fourteen magnetic poles and twelve slots, the ratio A/B of the circumferential width A of the magnet 223 and the circumferential width B at a distal end (tooth distal end portion 212a) of the tooth 212 is set to satisfy the expression 0.85<A/B<1.00. For this reason, unbalanced load generated on the rotor 203 becomes small (for example, smaller than that obtained when A/B=1) (see an experiment result in FIG. 17), and consequently, vibration can be reduced. More specifically, FIG. 17 shows the magnitude of the unbalanced load generated on the rotor 203 when the ratio A/B was changed in the experiment. As is apparent from FIG. 17, when the ratio A/B satisfies the expression 0.85<A/B<1.00, in comparison with a case in which the circumferential width A of the magnet 223 is simply set to be equal to the circumferential width B at the distal end (tooth distal end portion 212*a*) of the teeth 212 (i.e., the ratio A/B is ), the unbalanced load on the rotor 203 becomes small. In the present embodiment, the ratio A/B is set to 0.95 at which the unbalanced load on the rotor 203 is substantially minimum within a range in which the expression 0.85<A/B<1.00 is satisfied. FIG. 18A shows a trace of unbalanced load generated on the rotor 203 within one cycle of an electric angle in the present embodiment (A/B=0.95), and FIG. 18B shows a trace of unbalanced load generated on the rotor 203 within one cycle of an electric angle when the ratio A/B is set to 1.10. The trace (the present embodiment) shown in FIG. 18A is substantially a perfect circle and exhibits a relatively small unbalanced load on the rotor 203. On the other hand, the trace (A/B=1.10) shown in FIG. 18B is considerably different from a perfect circle, and unbalanced load on the rotor 203 is larger than that in FIG. 18A.

The above embodiment may be modified as follows.

In the above embodiment, the tooth shaft portions 212*d* are arranged at equal 30° intervals in the circumferential direction, and the tooth distal end portions 212*a* uniformly project from the tooth shaft portions 212*d* to both the sides in the circumferential direction. However, the present invention is not limited to this, and the configuration may be changed.

Figure 19A:
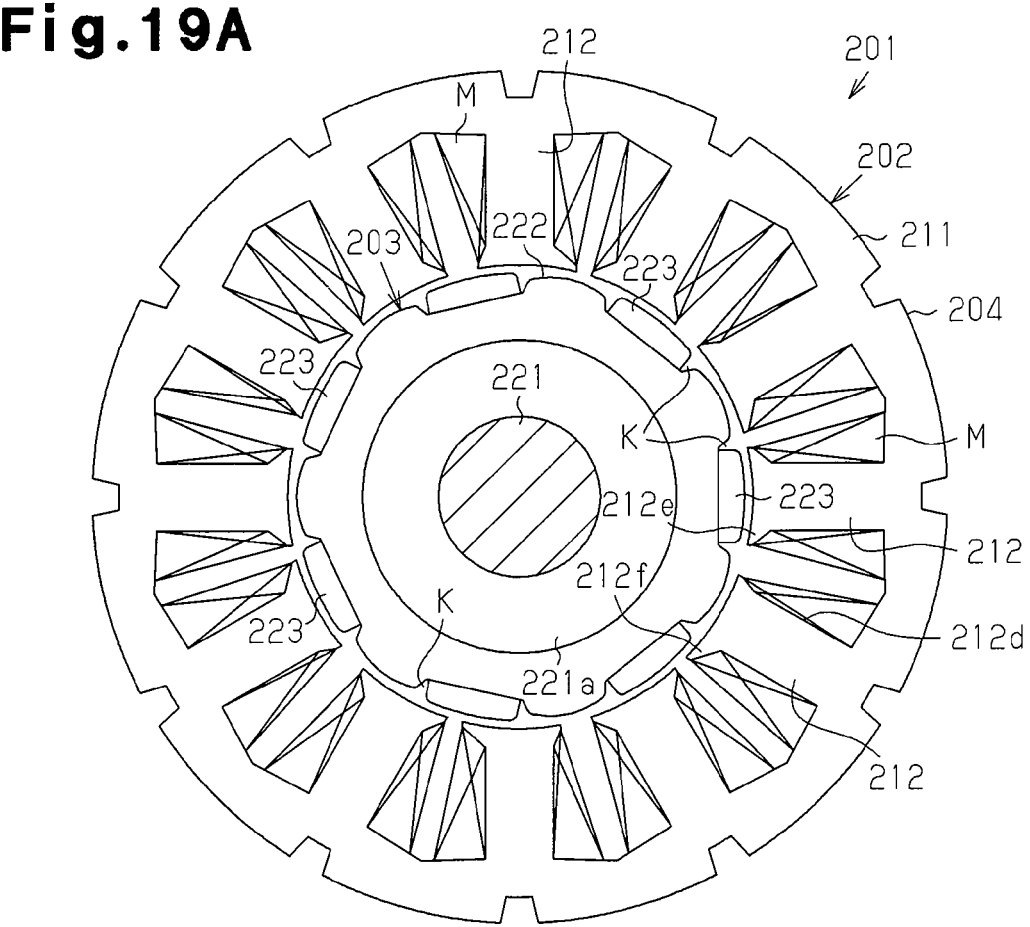
FIG. 19A is a plan view of a motor of a modification.
Figure 19B:
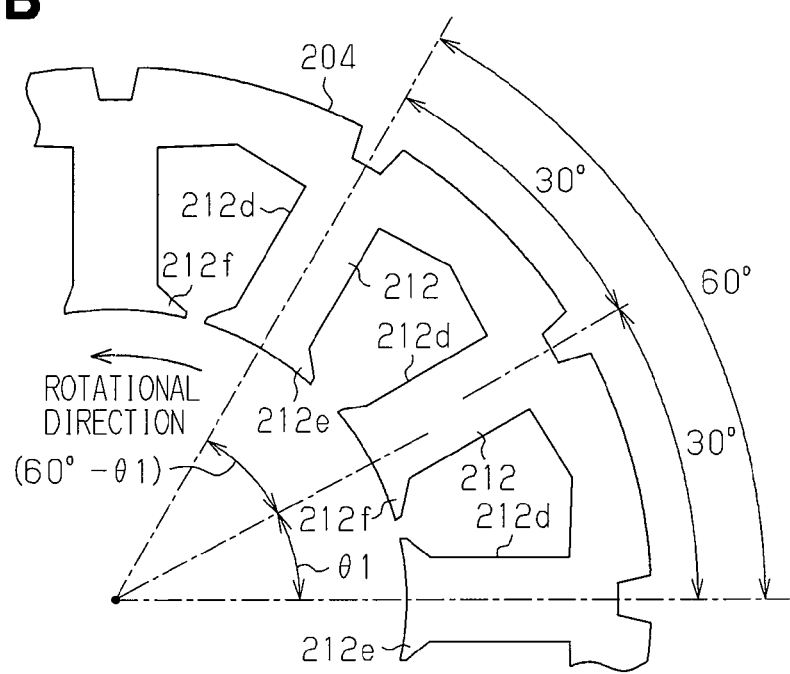
FIG. 19B is a partially enlarged view of a stator core in the motor in FIG. 19A.

For example, as shown in FIGS. 19A and 19B, some tooth distal end portions need not uniformly project from the tooth shaft portion 212*d* to both the sides in the circumferential direction. More specifically, first tooth distal end portions 212*e* alternately arranged in a rotational direction (counterclockwise direction in FIG. 19B) of the rotor 203 uniformly project from the tooth shaft portions 212*d* to both the sides in the circumferential direction, and second tooth distal end portions 212*f* adjacent to the first tooth distal end portions 212*e* in the rotational direction of the rotor 203 do not uniformly project from the tooth shaft portions 212*d* to both the sides in the circumferential direction. More specifically, an angular interval pitch $\theta 1$ between a center of the second tooth distal end portion 212*f* in the circumferential direction and a center of the first tooth distal end portion 212*e* adjacent to the second tooth distal end portion 212*f* satisfies the expression 27.5°<$\theta 1$<30°. The angular interval pitch between the second tooth distal end portion 212*f* and the first tooth distal end portion 212*e* adjacent to the second tooth distal end portion 212*f* in the rotational direction of the rotor 203 is an angle obtained by subtracting $\theta 1$ from 60° (60°−$\theta 1$).

Figure 20:
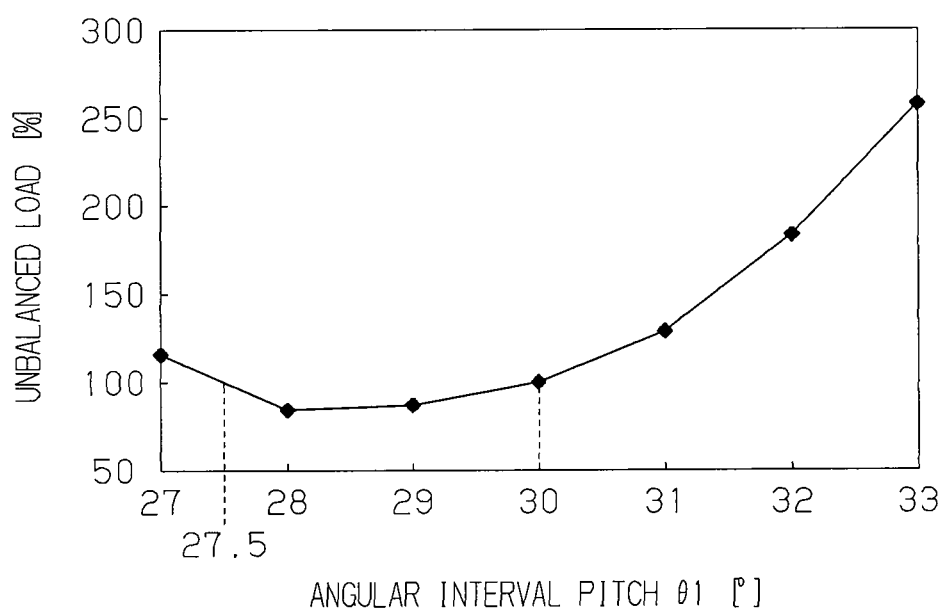
FIG. 20 a graph showing the relationship between the angular space pitch θ1 between adjacent tooth distal end portions and unbalanced load generated on a rotor.

In this manner, unbalanced load on the rotor 203 decreases (for example, smaller than that obtained when $\theta 1$=30°) (see an experiment result in FIG. 20), and consequently, vibration can be more reduced. More specifically, FIG. 20 shows the magnitude of unbalanced load generated on the rotor 203 when the angular interval pitch $\theta 1$ was changed in an experiment. As is apparent from FIG. 20, when the angular interval pitch $\theta 1$ satisfies the expression 27.5°<$\theta 1$<30°, in comparison with the case in which the angular interval pitch $\theta 1$ is simply set to 30° ($\theta 1$=30°), unbalanced load on the rotor 203 decreases. Therefore, in the present embodiment, the angular interval pitch $\theta 1$ is set to 28° within a range in which the expression 27.5°<$\theta 1$<30° is satisfied.

Figure 21A:
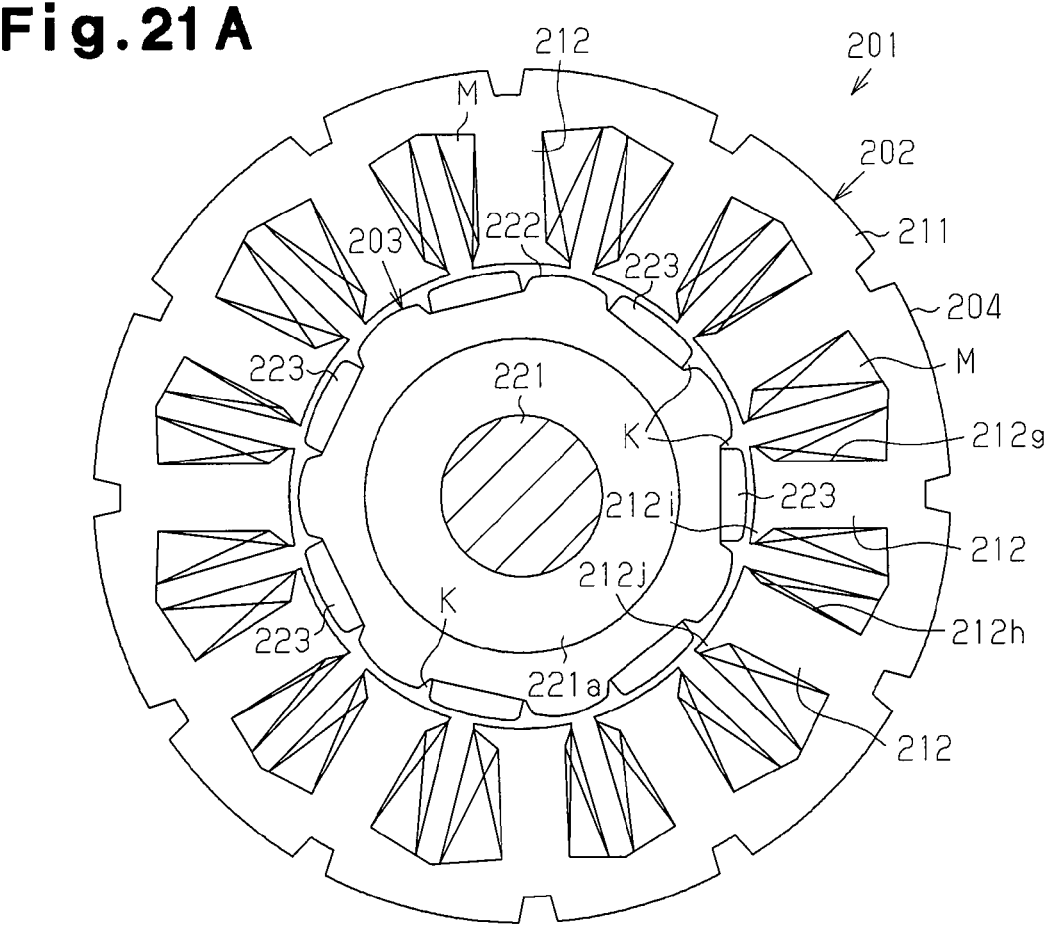
FIG. 21A is a plan view of a motor of a modification.
Figure 21B:
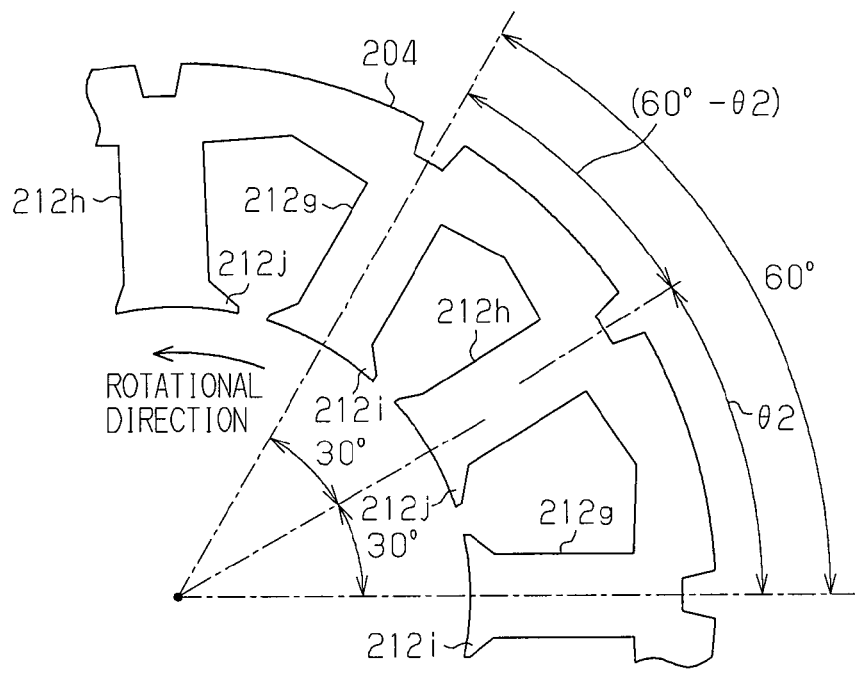
FIG. 21B is a partially enlarged view of a stator core in the motor in FIG. 21A.

For example, as shown in FIGS. 21A and 21B, the angular interval pitch between shaft portions may be changed. More specifically, first tooth shaft portions 212*g* alternately arranged in a rotational direction (counterclockwise direction in FIG. 21B) of the rotor 203 are arranged to have equal angular interval pitches of 60° therebetween in the circumferential direction. An angular interval pitch $\theta 2$ between a second tooth shaft portion 212*h* adjacent to the first tooth shaft portion 212*g* in the rotational direction of the rotor 203 and the first tooth shaft portion 212*g* satisfies the expression 30.0°<$\theta 2$<33.5°. A first tooth distal end portion 212*i* corresponding to the first tooth shaft portion 212*g* uniformly projects from the first tooth shaft portion 212*g* to both the sides in the circumferential direction. On the other hand, circumferential centers of the second tooth distal end portions 212*j* corresponding to the second tooth shaft portions 212*h* are arranged from the first tooth distal end portion 212*i* at equal angular intervals of 30° in the circumferential direction and ununiformly project from the second tooth shaft portions 212*h*. An angular interval pitch between the second tooth shaft portion 212*h* and the first tooth shaft portion 212*g* adjacent to the second tooth shaft portion 212*h* in the rotational direction of the rotor 203 is an angle obtained by subtracting $\theta 2$ from 60° (60°−$\theta 2$).

Figure 22:
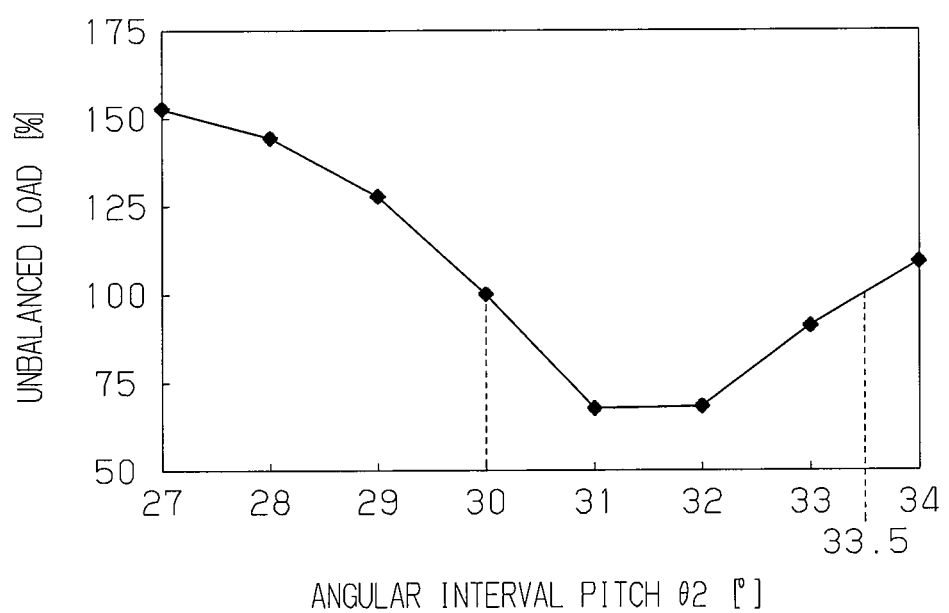
FIG. 22 is a graph showing the relationship between the angular space pitch θ2 between adjacent tooth shaft portions and unbalanced load generated on a rotor.

In this manner, unbalanced load on the rotor 203 becomes small (for example, smaller than that obtained when $\theta 2$=30°) (see an experiment result in FIG. 22), and consequently, vibration can be more reduced. More specifically, FIG. 22 shows the magnitude of unbalanced load generated on the rotor 203 when the angular interval pitch $\theta 2$ was changed in the experiment. As is apparent from FIG. 22, when the angular interval pitch $\theta 2$ satisfies the expression 30.0°<$\theta 2$<33.5°, in comparison with the case in which the angular interval pitch $\theta 2$ is simply set to 30° ($\theta 2$=30°), unbalanced load on the rotor 203 decreases. Therefore, in the present embodiment, the angular interval pitch $\theta 2$ is set to 32° within a range in which the expression 30.0°<$\theta 2$<33.5° is satisfied.

A fourth embodiment obtained by embodying the present invention will be described below. The fourth embodiment is mainly different from the third embodiment in that a motor includes a housing and an intermediate member is not interposed between a rotating shaft portion and a rotor core. The same reference numerals as in the third embodiment denote the same parts in the fourth embodiment, and a description thereof will be omitted.

Figure 23A:
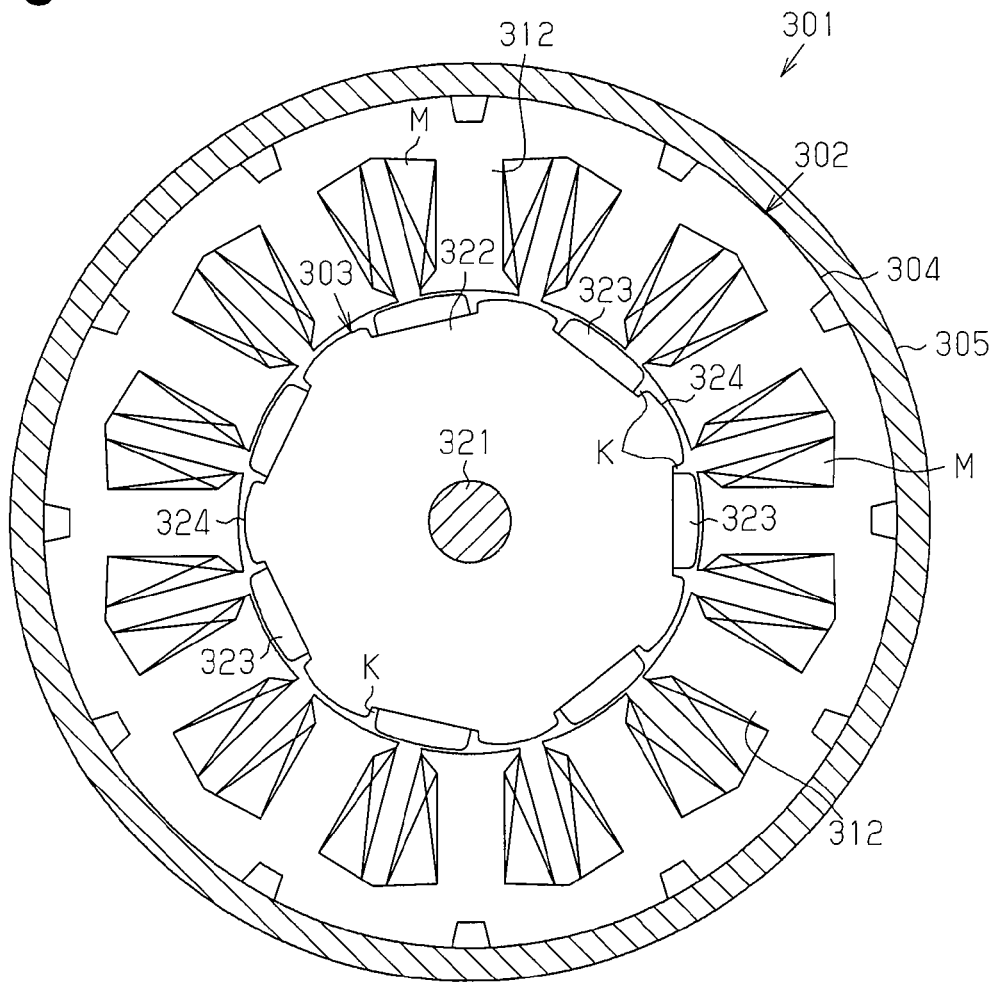
FIG. 23A is a plan view of a motor according to a fourth embodiment.
Figure 23B:
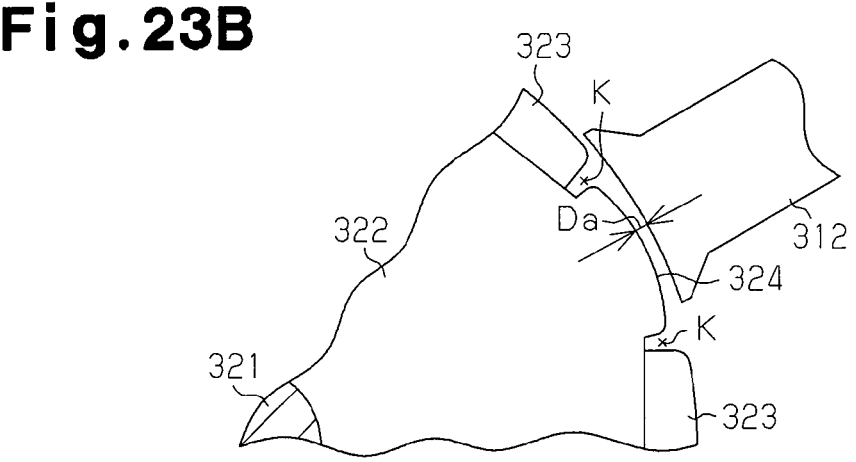
FIG. 23B is a partially enlarged view of the motor in FIG. 23A.
Figure 24:
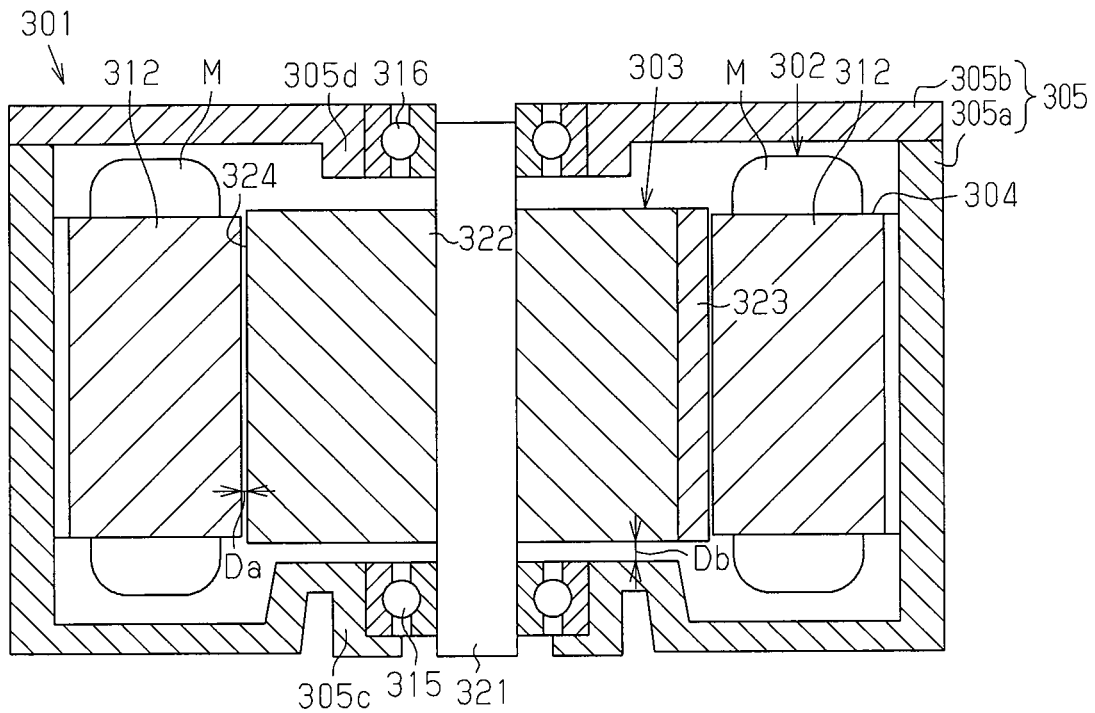
FIG. 24 is a cross-sectional view of the motor in FIG. 23A.

FIGS. 23A, 23B, and 24 show an inner-rotor-type brushless motor (hereinafter simply referred to as a motor) 301. The motor 301 includes a housing 305. The housing 305 stores and holds a stator 302 and supports a rotor 303 such that the rotor 303 can be rotated by a rotating shaft portion 321. More specifically, the housing 305 includes a substantially bottomed cylindrical housing body 305*a* made of a magnetic metal material, and a cover member 305*b* made of a nonmagnetic material such as a resin, stainless steel, or brass to substantially close an opening end of the housing body 305*a*. A bearing holding portion 305*c* formed at a center of a bottom portion of the housing body 305*a* and a bearing holding portion 305*d* formed at a center of the cover member 305*b* hold bearings (ball bearings) 315 and 316, respectively. The rotating shaft portion 321 of the rotor 303 is rotatably supported by the bearings 315 and 316, respectively.

A substantially annular rotor core 322 made of a magnetic metal material is fixed to an outer peripheral surface of the rotating shaft portion 321. Seven N-pole magnets 323 are arranged in the circumferential direction on the outer peripheral portion of the rotor core 322. Between the adjacent magnets 323, a salient pole 324 integrated with the outer peripheral portion of the rotor core 322 is arranged through a gap K.

In this case, the ratio Db/Da of a (minimum) distance Da between the stator 302 and the salient pole 324 in the radial direction, i.e., a gap (see FIG. 23B) between the distal end portion of teeth 312 and the salient pole 324 and a (minimum) distance Db between the rotor core 322 and the magnetic material portion in the housing 305, i.e., a gap (see FIG. 24) between the rotor core 322 and the bearing holding portion 305c is set to satisfy the expression 1.0<Db/Da≤10.0, more preferably, the expression 4.0≤Db/Da≤8.5. Furthermore, in the present embodiment, the ratio Db/Da is set to 8.5 (Db/Da=8.5).

According to the fourth embodiment, in addition to the advantages of the third embodiment, the following advantages can be obtained.

Figure 25:
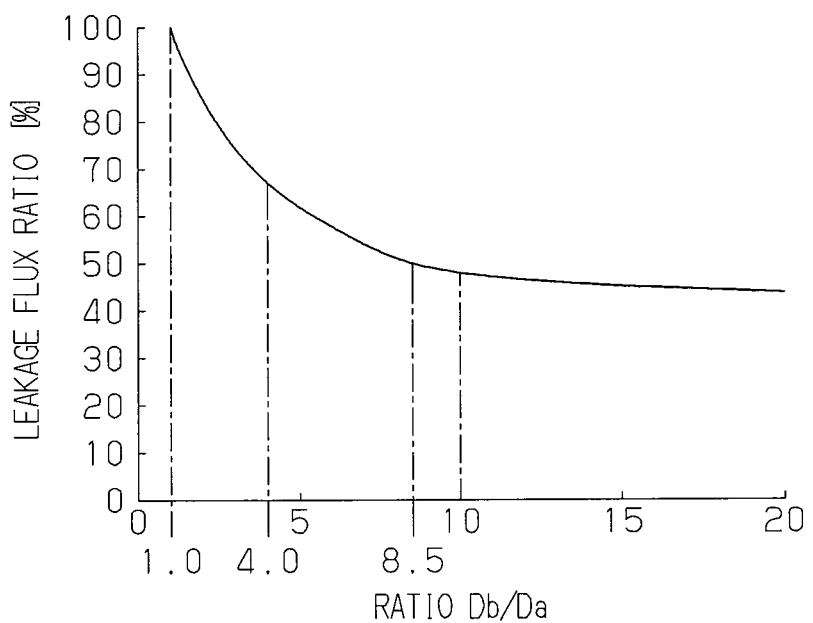
FIG. 25 is a graph showing the relationship between the ratio Db/Da and a leakage flux ratio.

(1) The ratio Db/Da of the distance Da between the stator 302 (distal end portion of the teeth 312) and the salient pole 324 in the radial direction and the distance Db between the rotor core 322 and the magnetic material portion (bearing holding portion 305c) in the housing 305 is set to satisfy the expression 1.0<Db/Da≤10.0. For this reason, a leakage flux becomes small (for example, smaller than that obtained when Db/Da=1.0 is satisfied) (see FIG. 25). A distance Db of a gap between the rotor core 322 and the magnetic material portion (bearing holding portion 305c) in the housing 305 is not increased more than necessary. More specifically, FIG. 25 shows a leakage flux ratio curve obtained when the ratio Db/Da was changed in an experiment using the case in which the ratio Db/Da was 1.0 as a reference (100%). As is apparent from FIG. 25, when the ratio Db/Da satisfies the expression 1.0<Db/Da, in comparison with the case in which the distance Da and the distance Db are simply made equal to each other (i.e., ratio Db/Da=1.0), a leakage flux ratio becomes small. As is apparent from FIG. 25, when the ratio Db/Da satisfies the expression 1.0<Db/Da≤10.0, a leakage flux ratio gradually decreases. However, when the ratio Db/Da is larger than 10.0, the leakage flux ratio substantially remains unchanged. Therefore, in the present embodiment, the ratio Db/Da is set to satisfy the expression 1.0<Db/Da≤10.0. For this reason, while avoiding unnecessary size increase of the motor 301 in the axial direction, the leakage flux is reduced to make it possible to obtain a high-output motor 301.

(2) As shown in FIG. 25, the ratio Db/Da is 4.0 or more which is an inflection point of the curve, and 8.5 or less at which a leakage flux reducing effect becomes small; namely, the ratio can be set to satisfy the expression 4.0≤Db/Da≤8.5. At this time, in comparison with the case in which the ratio Db/Da is 1.0, a leakage flux ratio can be effectively and considerably reduced from ⅔ (67%) to ½ (50%).

A fifth embodiment obtained by embodying the present invention will be described below. The same reference numerals as in the fourth embodiment denote the same parts in the fifth embodiment, and a description thereof will be omitted.

Figure 26A:
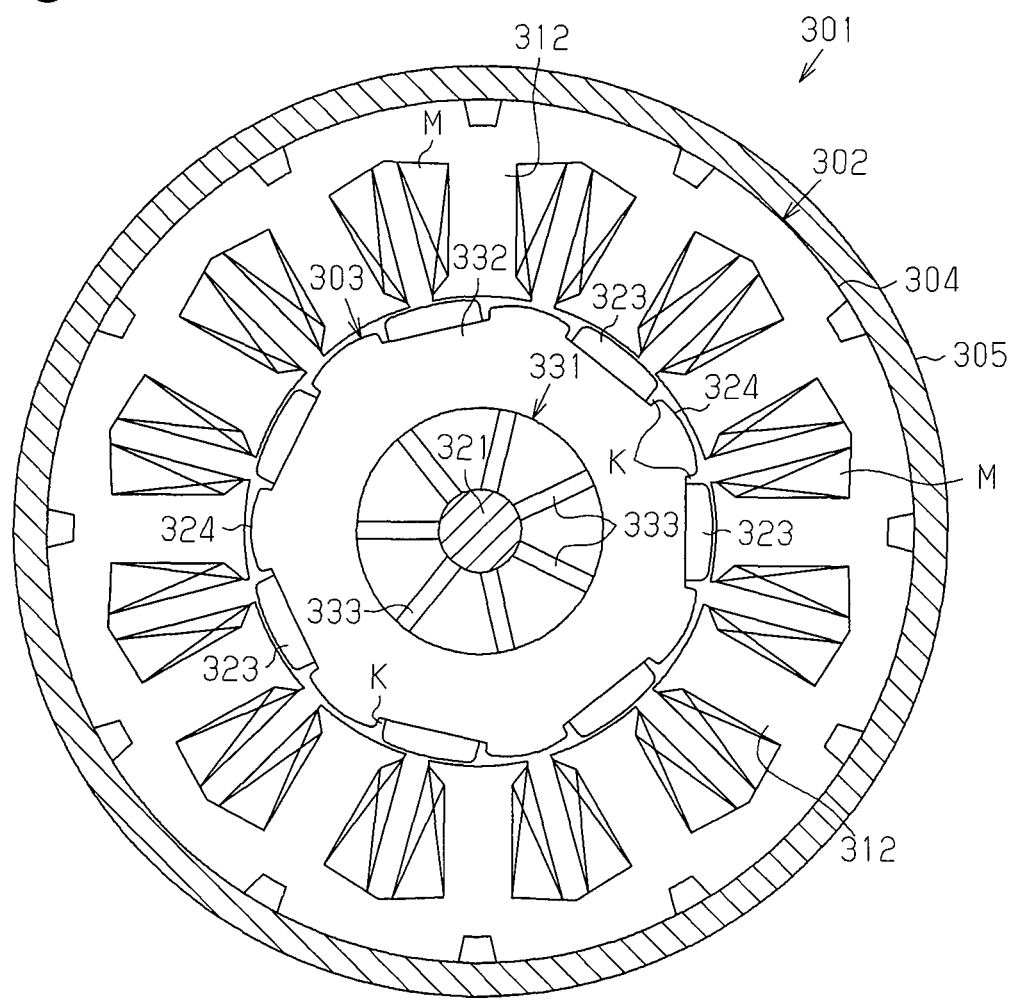
FIG. 26A is a plan view of a motor according to a fifth embodiment.
Figure 26B:
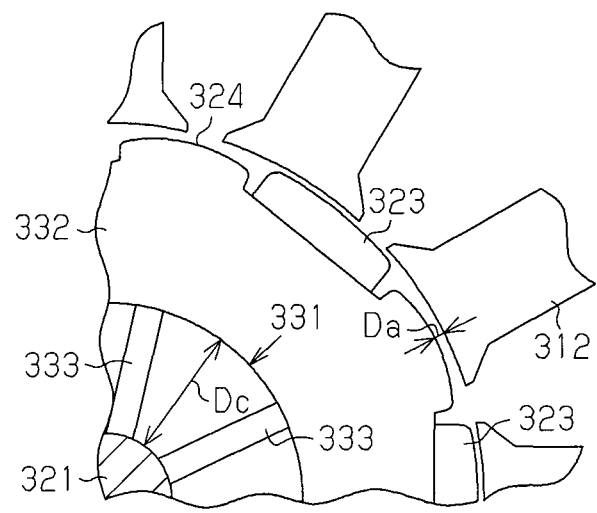
FIG. 26B is a partially enlarged view of the motor in FIG. 26A.

In the present embodiment, on the outer peripheral surface of the rotating shaft portion 321, as shown in FIGS. 26A and 26B, a rotor core 332 is fixed through a high-magnetic resistor portion 331. More specifically, the high-magnetic resistor portion 331 includes a plurality of connecting portions 333 extending from the rotating shaft portion 321 to the rotor core 332 in a spoke-like manner. The connecting portions 333 are arranged at circumferential positions corresponding to center positions of the salient poles 324 in the circumferential direction. The circumferential width (width in a direction orthogonal to the radial direction) of the connection portion 333 is smaller than the circumferential width of the salient pole 324. The rotor core 332 is formed by laminating core sheets in the axial direction, and the connecting portions 333 are formed such that parts each having an axial-direction thickness smaller than an axial-direction thickness of the core sheet are arranged next to each other in the axial direction with gaps. The parts are obtained by collapsing, for example, a plate material for a core sheet.

In this case, the ratio Dc/Da of a (minimum) distance Da between the stator 302 and the salient pole 324 in the radial direction, i.e., a gap (see FIG. 26B) between the distal end portion of teeth 312 and the salient pole 324 and a (minimum) distance Dc (see FIG. 26C) between the rotor core 332 (except for the connection portions 333) and the rotating shaft portion 321 in the radial direction is set to satisfy the expression 8.0≤Dc/Da.

According to the fifth embodiment, in addition to the advantages of the third embodiment, the following advantages can be obtained.

Figure 27:
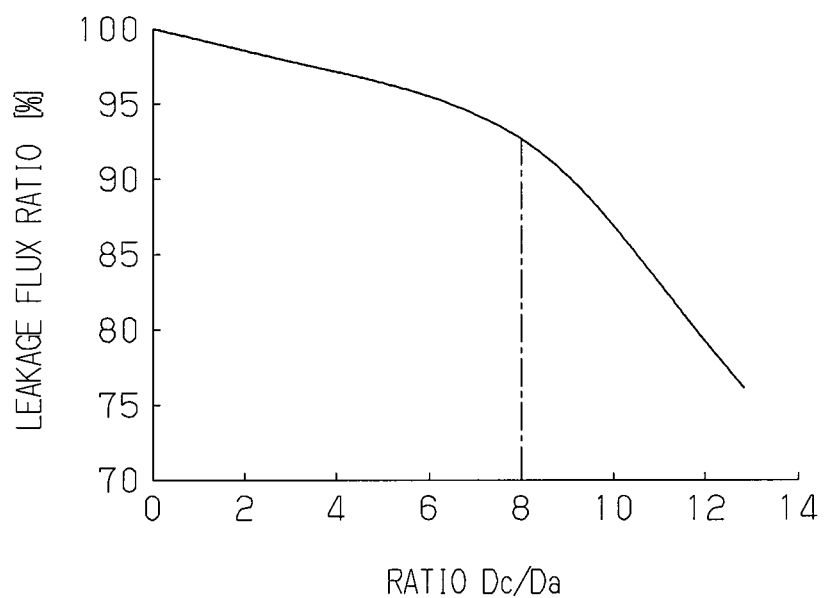
FIG. 27 is a graph showing the relationship between the ratio Dc/Da and a leakage flux ratio.

(1) The rotating shaft portion 321 and the rotor core 332 are fixed through the high-magnetic resistor portion 331 (connection portion 333). The ratio Dc/Da of the distance Da between the stator 302 (distal end portion of the teeth 312) and the salient pole 324 in the radial direction and the distance Dc between the rotor core 332 and the rotating shaft portion 321 in the radial direction is set to satisfy the expression 8.0≤Dc/Da. For this reason, a leakage flux becomes effectively small (for example, smaller than that obtained when Dc/Da=0 is satisfied) (see FIG. 27). Therefore, a high-output motor 301 can be effectively obtained. FIG. 27 shows a leakage flux ratio curve obtained when the ratio Dc/Da was changed in an experiment using the case in which the radio Dc/Da was 0 as a reference (100%). A point at which the ratio Dc/Da is 8.0 corresponds to an inflection point of the curve. The experiment (see FIG. 27) was executed in a state in which the ratio Db/Da was 10.0.

(2) The high-magnetic resistor portion 331 includes the plurality of connection portions 333 extending from the rotating shaft portion 321 to the rotor core 332 in a spoke-like manner. For this reason, gaps are formed between the connection portions 333 in the circumferential direction. Consequently, a magnetic resistance between the rotating shaft portion 321 and the rotor core 332 increases. With a concrete and simple configuration (for example, without arranging a non-magnetic material), the advantage described in the (1) can be obtained. Since the gaps are formed between the connection portions 333 in the circumferential direction, weight reduction can be achieved.

(3) The connection portions 333 are arranged at positions corresponding to the salient poles 324 in the circumferential direction. For this reason, in comparison with a case in which the connection portion 333 are arranged at positions corresponding to the magnets 323 in the circumferential direction, a circuit that generates a leakage flux is not easily formed, and a leakage flux can be effectively reduced.

(4) The connection portions 333 are formed such that the plurality of parts each having an axial-direction thickness smaller than an axial-direction thickness of each of the core sheets are arranged with gaps along the axial position, the core sheets being laminated in the axial direction to form the rotor core 332. For this reason, a leakage flux can be made smaller than that obtained when connection portions are formed by arranging parts in the axial direction without a gap.

The above embodiments may be modified as follows.

In the motor 301 that is substantially the same as that in the fourth embodiment, a high-magnetic resistor portion to reduce a leakage flux of the rotor 303 may be arranged on at least a part of the housing 305 (housing body 305a), the rotating shaft portion 321, and the bearing 315 that rotatably supports the rotating shaft portion 321.

Figure 28A:
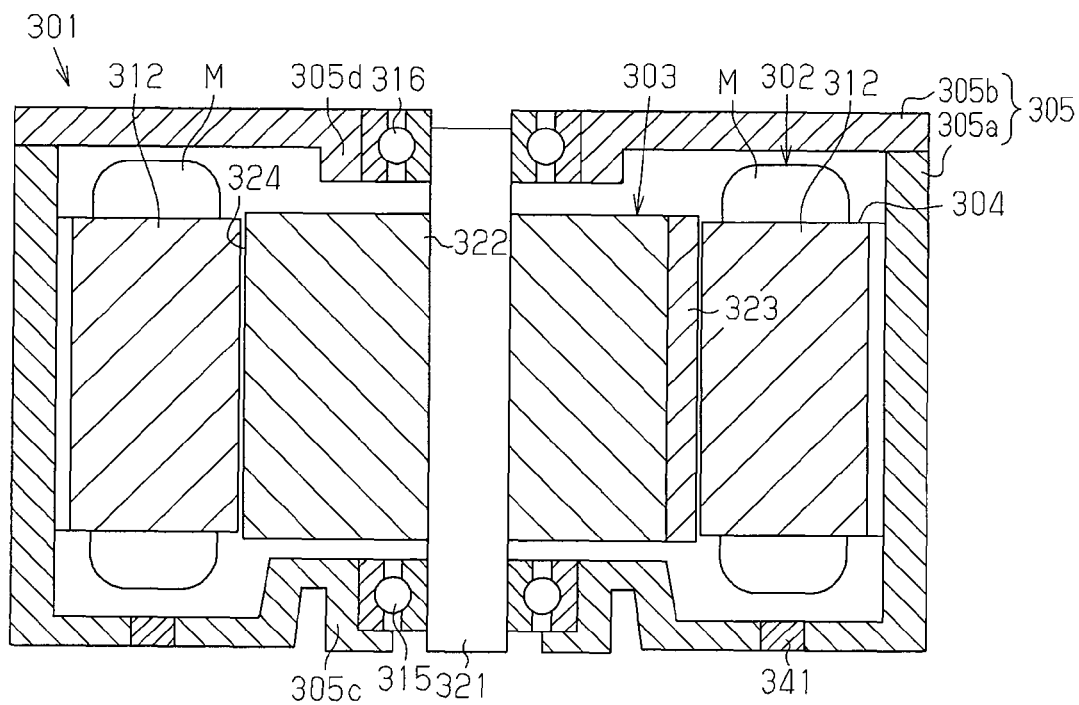
FIG. 28A is a cross-sectional view of a motor of a modification.
Figure 28B:
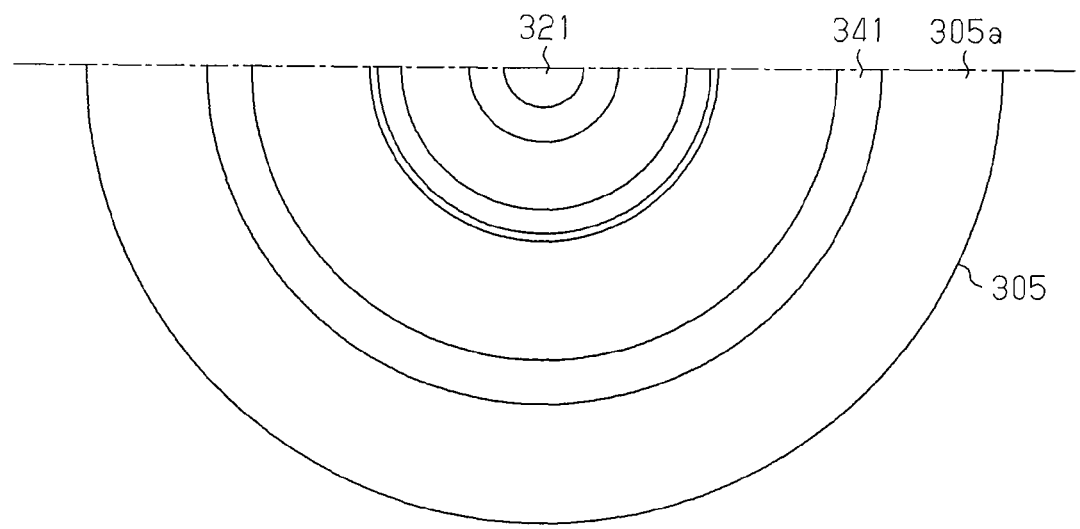
FIG. 28B is a partial bottom view of the motor in FIG. 28A.

For example, as shown in FIGS. 28A and 28B, an annular high-magnetic resistor portion 341 may be arranged at a position facing the stator 302 in the axial direction on a bottom portion of the housing body 305a. The high-magnetic resistor portion 341 is configured by, for example, a nonmagnetic material such as a resin, stainless steel, or brass, and is arranged to suppress a leakage flux transmitted from a stator core 304 to the rotating shaft portion 321 (rotor core 322). In this manner, a high-output motor 301 can be obtained.

Figure 29A:
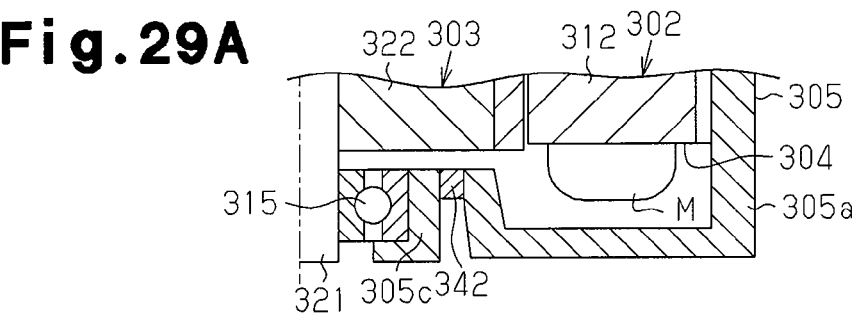
FIGS. 29A to 29C are partially enlarged views of motors of other modifications.

For example, as shown in FIG. 29A, on the bottom portion of the housing body 305a, an annular high-magnetic resistor portion 342 may be arranged at a position facing the rotor 303 in the axial direction and being closest to the rotor 303 in the axial direction. The high-magnetic resistor portion 342 is made of a nonmagnetic material such as a resin, stainless steel, or brass, and is arranged to suppress a leakage flux leaking from the rotor core 322 to the housing 305 (housing body 305a) in the axial direction and a leakage flux transmitted from the stator core 304 to the rotating shaft portion 321 (rotor core 322). In this manner, a high-output motor 301 can be obtained.

Figure 29B:
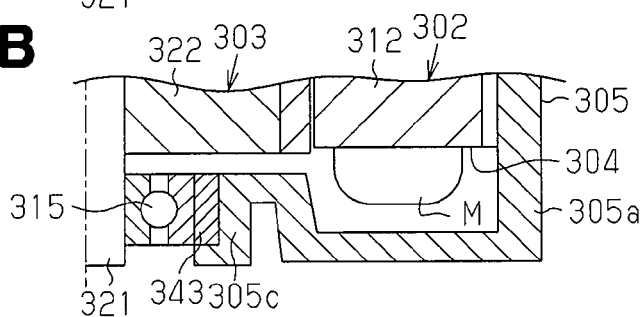

For example, as shown in FIG. 29B, an annular high-magnetic resistor portion 343 may be arranged between the bearing holding portion 305c and the bearing 315. The high-magnetic resistor portion 343 is made of a nonmagnetic material such as a resin, stainless steel, or a brass, and is arranged to suppress a leakage flux transmitted from the housing 305 (housing body 305a) to the rotor core 322 through the rotating shaft portion 321. In this manner, a high-output motor 301 can be obtained.

Figure 29C:
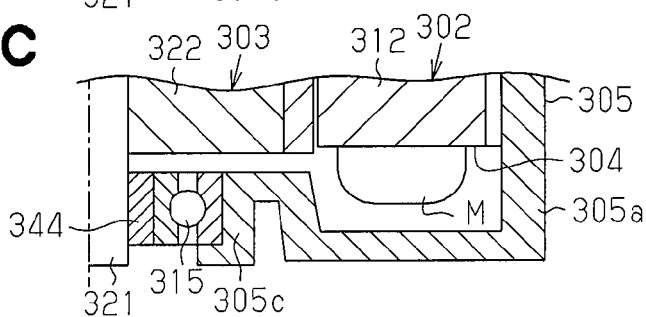

For example, as shown in FIG. 29C, an annular high-magnetic resistor portion 344 may be arranged between the rotating shaft portion 321 and the bearing 315. The high-magnetic resistor portion 344 is made of a nonmagnetic material such as a resin, stainless steel, or a brass, and is arranged to suppress a leakage flux transmitted from the housing 305 (housing body 305a) to the rotor core 322 through the rotating shaft portion 321. In this manner, a high-output motor 301 can be obtained.

Figure 30:
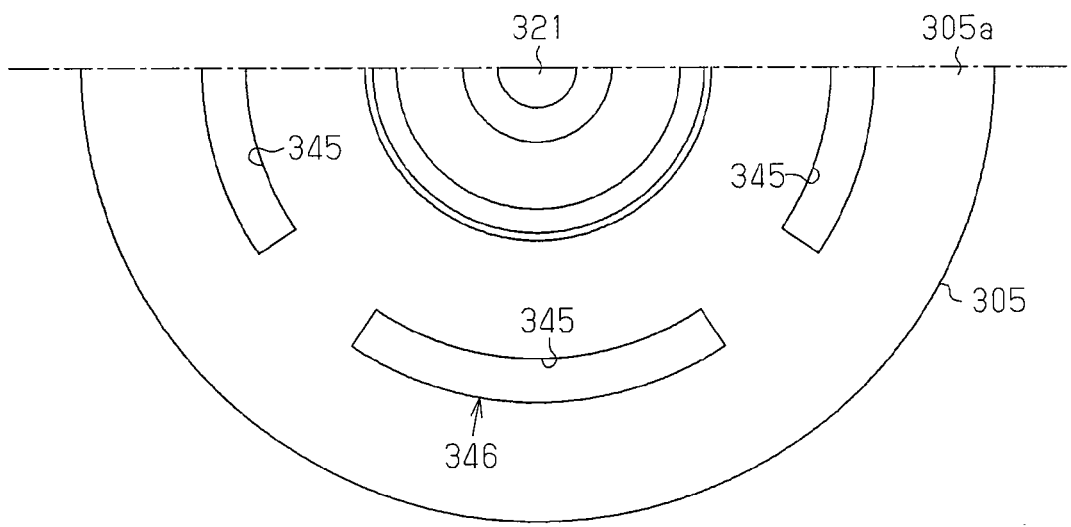
FIG. 30 is a partial bottom view of a motor of a modification.

For example, as shown in FIG. 30, on a bottom portion of the housing body 305a of the housing 305, a plurality of gaps (through holes) 345 are formed in the circumferential direction at positions facing the stator 302 in the axial direction to form a high-magnetic resistor portion 346. The high-magnetic resistor portion 346 increases a magnetic resistance at a position in the radial-direction where the gap 345 is formed to suppress leakage flux transmitted from the stator core 304 to the rotating shaft portion 321 (rotor core 322). In this manner, a high-output motor 301 can be obtained.

For example, the entire rotating shaft portion 321 may be a high-magnetic resistor portion made of a nonmagnetic material such as a resin, stainless steel, or brass. In this manner, a leakage flux transmitted from the housing 305 (housing body 305a) to the rotor core 322 through the rotating shaft portion 321 can be suppressed, and a high-output motor 301 can be obtained.

In the fourth embodiment, the ratio Db/Da is set to satisfy the expression $4.0 \leq Db/Da \leq 8.5$. However, the ratio Db/Da may be changed to satisfy the expression $1.0 < Db/Da \leq 10.0$ but not to satisfy the expression $4.0 \leq Db/Da \leq 8.5$. In this manner, the same advantage as the advantage (1) of the first embodiment can be obtained.

In the fourth embodiment, the cover member 305b is made of a nonmagnetic material such as a resin, stainless steel, or brass. However, when the ratio Db/Da is set to satisfy the expression $1.0 < Db/Da \leq 10.0$, the cover member 305b may be changed into a cover member made of a magnetic (metal) material.

In the fifth embodiment, the high-magnetic resistor portion 331 includes the connection portions 333 extending from the rotating shaft portion 321 to the rotor core 332 in a spoke-like manner. However, the high-magnetic resistor portion 331 may be changed into another high-magnetic resistor portion (made of, for example, a nonmagnetic material such as a resin, stainless steel, or brass) that has a high-magnetic resistance and can connect the rotating shaft portion 321 and the rotor core 332 (except for the connection portion 333) in the radial direction.

In the fifth embodiment, the connection portions 333 are arranged at positions corresponding to the salient poles 324 in the circumferential direction. However, the present invention is not limited to the configuration, and the connection portions 333 may be arranged at positions corresponding to the magnets 323 in the circumferential direction.

In the fifth embodiment, the connection portions 333 are formed such that the plurality of parts each having an axial-direction thickness smaller than an axial-direction thickness of each of the core sheets are arranged with gaps along the axial position, the core sheets being laminated in the axial direction to form the rotor core 332. However, the present invention is not limited to the configuration, and the connection portions 333 may be formed such that parts are arranged in the axial direction without a gap.

In the fourth and fifth embodiments, a gap or a portion made of a nonmagnetic material is used as a high-magnetic resistor portion. However, in place of this, a portion to which stress is applied to have a high-magnetic resistance or a portion that is changed with laser irradiation to have a high-magnetic resistance may be used.

In the fourth and fifth embodiments, the number of teeth 312 (and the coils M) is twelve, and the number of magnets 323 (salient poles 324) is seven, i.e., the fourteen-pole rotor 303 is used. However, the present invention is not limited to the configuration, and the numbers may be changed into other numbers.

In the fourth and fifth embodiments, the stator 302 is obtained by a concentrated winding. However, the stator may be changed into a stator configured by a distributed winding obtained by winding the coils M over a plurality of teeth.

In the fourth and fifth embodiments, the rotor 303 is of a surface magnet type. However, the rotor 303 may be changed into a rotor that is of a consequent-pole and of an interior permanent magnet type (IPM), in which magnets are buried in a rotor core.

What is claimed is:
1. A motor comprising:
a rotor including a rotor core, a plurality of magnets arranged at equal intervals in a circumferential direction of the rotor core and functioning as a first magnetic pole, where each magnet of the plurality of magnets has substantially similar magnetization, and salient poles integrated with the rotor core, each arranged between adjacent magnets and at a distance from the magnets, the salient poles functioning as a second magnetic pole, where each of the salient poles has substantially similar magnetization and the substantially similar magnetization of each of the salient poles is opposing in polarity to the substantially similar magnetization of each of the magnets; and
a stator arranged outside the rotor in a radial direction and having a stator core having a plurality of teeth extending in the radial direction of the stator and arranged at equal intervals in a circumferential direction, and multi-phase coils attached to the teeth, wherein the salient poles are arranged to have center portions arranged at equal intervals in the circumferential direction and each have an outer surface extending in the circumferential direction in a range of a predetermined opening angle having an axis of the rotor as a center, the salient poles include a first salient pole and a second salient pole, and the first salient pole and the second salient pole are at different positions in an axial direction of the rotor, and wherein a first opening angle serving as an opening angle of the outer surface of the first salient pole is different from a second opening angle serving as the opening angle of an outer surface of the second salient pole.

2. The motor according to claim 1, wherein
a boundary angle is represented by $\alpha$ at which a phase of a cogging torque generated at each of the salient poles when the opening angle of each of the salient poles is gradually changed is inverted from a normal phase into an antiphase, and a boundary angle is represented by $\beta$ at which the phase of the cogging torque is inverted from the antiphase to the normal phase (where $\alpha < \beta$), and one of the first and second opening angles is smaller than the boundary angle $\alpha$ or larger than the boundary angle $\beta$, and the other opening angle is not less than the boundary angle $\alpha$ and not more than the boundary angle $\beta$.

3. The motor according to claim 2, wherein
one of the first and second opening angles is smaller than the boundary angle $\alpha$, and the other opening angle is not less than the boundary angle $\alpha$ and not more than $\{(\alpha+\beta)/2\}$.

4. The motor according to claim 2, wherein
one of the first and second opening angles is larger than the boundary angle $\beta$, and the other opening angle is not less than $\{(\alpha+\beta)/2\}$ and not more than the boundary angle $\beta$.

5. The motor according to claim 1, wherein
the coils are arranged on the teeth by distributed winding.

6. A motor comprising:
a rotor including a rotor core, a plurality of magnets arranged in a circumferential direction of the rotor core and functioning as a first magnetic pole, and salient poles integrated with the rotor core and each arranged between adjacent magnets and at a distance from the magnets, the salient poles functioning as a second magnetic pole; and a stator arranged outside the rotor in a radial direction and having a stator core having teeth, the number of teeth is represented by L, extending in the radial direction of the stator and arranged at equal intervals in the circumferential direction and multi-phase coils attached to the teeth, wherein each of the salient poles has an outer surface extending in the circumferential direction in a range of a first opening angle $Yk\theta(°)$ having an axis of the rotor as a center, each of the teeth has a distal end portion extending in the circumferential direction in a range of a second opening angle $T\theta(°)$ having the axis of the rotor as a center, and the first opening angle $Yk\theta(°)$ and the second opening angle $T\theta(°)$ are set to satisfy the following expression:

$Yk\theta = T\theta + (a-1) \times 360(°)/L$ (where a is a positive integer and is not equal to 1).

7. The motor according to claim 6, wherein
the stator further includes slots each formed between adjacent teeth, the coils are a multi-phase segment coils each having a plurality of segment conductors, each of the segment conductors has a slot insertion portion extending in the slot to penetrate the stator core in the axial direction and a slot projecting portion projecting from the slot in the axial direction, the segment conductors of different phases are electrically connected to each other in the circumferential direction at the slot projecting portions, and when the number of magnets and the number of phases of the segment coils are represented by p (p is an integer equal to or larger than two) and m, respectively, the number L of teeth satisfies the following expression:

$L = 2 \times p \times m \times n$ (where n is a positive integer).

8. The motor according to claim 6, wherein
when the number of magnets and the number of phases of the coils are represented by p (p is an integer equal to or larger than two) and m, respectively, the number L of teeth satisfies the following expression:

$L = p \times m$.

9. A motor comprising:
a fourteen-magnetic-pole rotor having a rotor core, seven magnets arranged in a circumferential direction of the rotor core and functioning as a first magnetic pole, and salient poles integrated with the rotor core, each arranged between adjacent magnets and at a distance from the magnets, the salient poles functioning as a second magnetic pole; and a stator having a stator core having twelve teeth extending in a radial direction and arranged in the circumferential direction, twelve slots each arranged between adjacent teeth, and coils wound on the teeth and stored in the slots, wherein the ratio A/B of a circumferential width A of each magnet and a circumferential width B at a distal end portion of each tooth facing the rotor in the radial direction is set to satisfy the following expression:

$0.85 < A/B < 1.00$.

* * * * *